US011100316B2

(12) United States Patent
Porikli et al.

(10) Patent No.: US 11,100,316 B2
(45) Date of Patent: Aug. 24, 2021

(54) ACTIVITY RECOGNITION METHOD USING VIDEOTUBES

(71) Applicant: Futurewei Technologies, Inc., Plano, TX (US)

(72) Inventors: Fatih Porikli, San Jose, CA (US); Qijie Xu, Santa Clara, CA (US); Luis Bill, Daly City, CA (US); Huang Wei, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/822,923

(22) Filed: Mar. 18, 2020

(65) Prior Publication Data
US 2020/0320287 A1    Oct. 8, 2020

Related U.S. Application Data

(63) Continuation of application No. 15/867,932, filed on Jan. 11, 2018, now Pat. No. 10,628,667.

(51) Int. Cl.
*G06T 7/11* (2017.01)
*G06K 9/32* (2006.01)
*G06K 9/00* (2006.01)

(52) U.S. Cl.
CPC ..... *G06K 9/00389* (2013.01); *G06K 9/00845* (2013.01); *G06K 9/3233* (2013.01); *G06T 7/11* (2017.01); *B60Y 2302/03* (2013.01)

(58) Field of Classification Search
None
See application file for complete search history.

(56) References Cited

U.S. PATENT DOCUMENTS

| 5,454,043 A | 9/1995 | Freeman |
| 5,809,437 A | 9/1998 | Breed |

(Continued)

FOREIGN PATENT DOCUMENTS

| CN | 1200397 C | 5/2005 |
| WO | WO-2017206147 A1 | 12/2017 |

OTHER PUBLICATIONS

"U.S. Appl. No. 15/867,932, Non Final Office Action dated Aug. 20, 2019", 37 pgs.

(Continued)

*Primary Examiner* — Idowu O Osifade
(74) *Attorney, Agent, or Firm* — Schwegman Lundberg & Woessner, P.A.

(57) ABSTRACT

An activity recognition device comprises a port configured to receive a video stream from a video source for a first object and a second object; a memory configured to store instructions and image frames of the video stream; and one or more processors, wherein the one or more processors execute the instructions stored in the memory, the one or more processors configured to: select portions of the image frames based on presence of the first object; determine areas within the portions of image frames, wherein locations of the first object in the video frames are bounded by the determined areas; determine motion of the first object and locations of a second object within the areas of the image frames; and identify an activity according to the determined motion and locations of the second object, and generate an alert according to the identified activity.

20 Claims, 17 Drawing Sheets

(56) References Cited

U.S. PATENT DOCUMENTS

| | | | |
|---|---|---|---|
| 6,128,003 | A | 10/2000 | Smith et al. |
| 6,931,145 | B1 | 8/2005 | Kroos et al. |
| 7,421,369 | B2 | 9/2008 | Clarkson |
| 7,702,130 | B2 | 4/2010 | Im et al. |
| 8,189,866 | B1 | 5/2012 | Gu et al. |
| 8,345,984 | B2 | 1/2013 | Ji et al. |
| 9,354,711 | B2 | 5/2016 | Kumar et al. |
| 9,501,693 | B2 | 11/2016 | Sarratt et al. |
| 2005/0122397 | A1 | 6/2005 | Henson et al. |
| 2010/0141397 | A1 | 6/2010 | Kim et al. |
| 2010/0174674 | A1 | 7/2010 | Unuma et al. |
| 2011/0182469 | A1 | 7/2011 | Ji et al. |
| 2012/0200486 | A1 | 8/2012 | Meinel et al. |
| 2014/0161322 | A1 | 6/2014 | Cheng et al. |
| 2014/0294295 | A1 | 10/2014 | Kim et al. |
| 2015/0131857 | A1* | 5/2015 | Han .................. G06K 9/00845 382/103 |
| 2015/0251697 | A1* | 9/2015 | Lavoie .................. B62D 13/06 701/523 |
| 2016/0091975 | A1 | 3/2016 | Kumar et al. |
| 2016/0209927 | A1 | 7/2016 | Yamagishi et al. |
| 2016/0210504 | A1 | 7/2016 | Kim |
| 2017/0305362 | A1* | 10/2017 | Tiryaki .................. G06F 3/017 |
| 2017/0344838 | A1 | 11/2017 | Zhou et al. |
| 2019/0213406 | A1 | 7/2019 | Porikli et al. |

OTHER PUBLICATIONS

"U.S. Appl. No. 15/867,932, Notice of Allowance dated Dec. 13, 2019", 8 pgs.

"U.S. Appl. No. 15/867,932, Response Filed Nov. 20, 2019 to Non Final Office Action dated Aug. 20, 2019", 11 pgs.

"Intel(r) RealSense tm SDK Hand Tracking Tutorial", [online]. [archived Dec. 4, 2016]. Retrieved from the Internet: <URL: https://web.archive.org/web/20161204092257/https://software.intel.com/sites/default/files/Hand_Tracking.pdf>, (2016), 1-17.

"International Application No. PCT/CN2018/120397, International Search Report and Written Opinion dated Feb. 28, 2019", (Feb. 28, 2019), 8 pgs.

Amir, Arnon, et al., "A Low Power, Fully Event-Based Gesture Recognition System", IEEE Conference on Computer Vision and Pattern Recognition (CVPR), (2017), 7388-7397.

Barnich, Olivier, et al., "ViBe: A universal background subtraction algorithm for video sequences", IEEE Transactions on Image Processing, 20(6), (Jun. 2011), 1-17.

Braunagel, Christian, et al., "Driver-Activity Recognition in the Context of Conditionally Autonomous Driving", 2015 IEEE 18th International Conference on Intelligent Transportation Systems, Las Palmas, (2015), 1652-1657.

Choi, Seunghyuk, "Advanced driver-assistance systems: Challenges and opportunities ahead", [online]. [retrieved on Feb. 7, 2018]. Retrieved from the Internet: <URL: http://www.mckinsey.com/industries/semiconductors/our-insights/advanced-driver-assistance-systems-challenges-and-opportunities-ahead>, (Feb. 2016), 16 pgs.

Danelljan, Martin, et al., "Discriminative Scale Space Tracking", IEEE Transactions on Pattern Analysis and Machine Intelligence, 39(8), (Aug. 2017), 1561-1575.

Das, Nikhil, "On Performance Evaluation of Driver Hand Detection Algorithms: Challenges, Dataset, and Metrics", IEEE 18th International Conference on Intelligent Transportation Systems, 2015, (2015), 2953-2958.

Gori, Ilaria, et al., "Multitype Activity Recognition in Robot-Centric Scenarios,", IEEE Robotics and Automation Letters, 1(1), (Jan. 2016), 593-600.

Liu, Wei, et al., "SSD: Single Shot MultiBox Detector", CVPR, arXiv:1512.02325v5 [cs.CV] Dec. 29, 2016, (2016), 17 pgs.

Ma, Chih-Yao, et al., "TS-LSTM and Temporal-Inception: Exploiting Spatiotemporal Dynamics for Activity Recognition", arXiv:1703.10667v1 [cs.CV] Mar. 30, 2017, (2017), 1-16.

Ma, Minghuang, et al., "Going Deeper into First-Person Activity Recognition", 2016 IEEE Conference on Computer Vision and Pattern Recognition, (2016), 1894-1903.

Molchanov, Pavlo, et al., "Hand Gesture Recognition with 3D Convolutional Neural Networks", 2015 IEEE Conference on Computer Vision and Pattern Recognition Workshops (CVPRW), Boston, MA, (2015), 7 pages.

Molchanov, Pavlo, et al., "Online Detection and Classification of Dynamic Hand Gestures with Recurrent 3D Convolutional Neural Networks", 2016 IEEE Conference on Computer Vision and Pattern Recognition (CVPR), Las Vegas, NV, (2016), 4207-4215.

Ohn-Bar, Eshed, et al., "Head, Eye, and Hand Patterns for Driver Activity Recognition", 2014 22nd International Conference on Pattern Recognition, Stockholm, Sweden, (2014), 660-665.

Ohn-Bar, Eshed, et al., "Looking at Humans in the Age of Self-Driving and Highly Automated Vehicles", IEEE Transactions on Intelligent Vehicles, 1(1), (Mar. 2016), 90-104.

Rangesh, Akshay, et al., "Long-Term Multi-Cue Tracking of Hands in Vehicles", IEEE Transactions on Intelligent Transportation Systems, 17(5), (May 2016), 1483-1492.

Redmon, Joseph, et al., "YOLO9000: Better, Faster, Stronger", arXiv:1612.08242v1 [cs.CV] Dec. 25, 2016, (2016), 1-9.

Ross, Philip E., "Today Big Brother Watches Truckers, Tomorrow He'll Watch You", [online]. [retrieved on Feb. 7, 2018]. Retrieved from the Internet: <URL: http://spectrum.ieee.org/cars-that-think/transportation/safety/big-brother-watches-truckers-now-and-youlater-cars-that-think>, (Mar. 26, 2015), 2 pgs.

Wang, Heng, et al., "Evaluation of Local Spatio-temporal Features for Action Recognition", Proceedings of the British Machine Vision Conference, (2009), 1-11.

Wang, Li, et al., "Evolving Boxes for Fast Vehicle Detection", Proceedings of the IEEE International Conference on Multimedia and Expo (ICME) 2017, Hong Kong, (2017), 1135-1140.

Zhang, Jing, et al., "An Approach of Region of Interest Detection Based on Visual Attention and Gaze Tracking", 2012 IEEE International Conference on Signal Processing, Communication and Computing (ICSPCC 2012), Hong Kong, (2012), 228-233.

U.S. Appl. No. 15/867,932, filed Jan. 11, 2018, Activity Recognition Method Using Videotubes.

"European Application No. 18899053.5, Extended European Search Report dated Feb. 8, 2021", (Feb. 8, 2021), 11 pgs.

Erol, Ali, et al., "Vision-based hand pose estimation: A Review", Computer Vision and Image Understanding, Academic Press, U.S., vol. 108, No. 1-2, (Sep. 1, 2007), 52-73.

Flores-Vazquez, Carlos, et al., "Human Activity Recognition from Object Interaction in Domestic Scenarios", 2016 IEEE Ecuador Technical Chapters Meeting (ETCM), IEEE, vol. 1, (Oct. 12, 2016), 1-6.

Ohn-Bar, Eshed, et al., "Beyond Just Keeping Hands on the Wheel: Towards Visual Interpretation of Driver Hand Motion Patterns", 2014 IEEE 17th International Conference on Intelligent Transportation Systems (ITSC), Oct. 8-11, 2014, Qingdao, China, (Oct. 8, 2014), 1245-1250.

Sarkar, Amrit, "Human Activity and Behavior Recognition in Videos—A Brief Review", XP055768051 retrieved from Internet Jan. 22, 2021 [https://grin.com/document/2706054], (Jan. 1, 2014), 12 pgs. X.

* cited by examiner

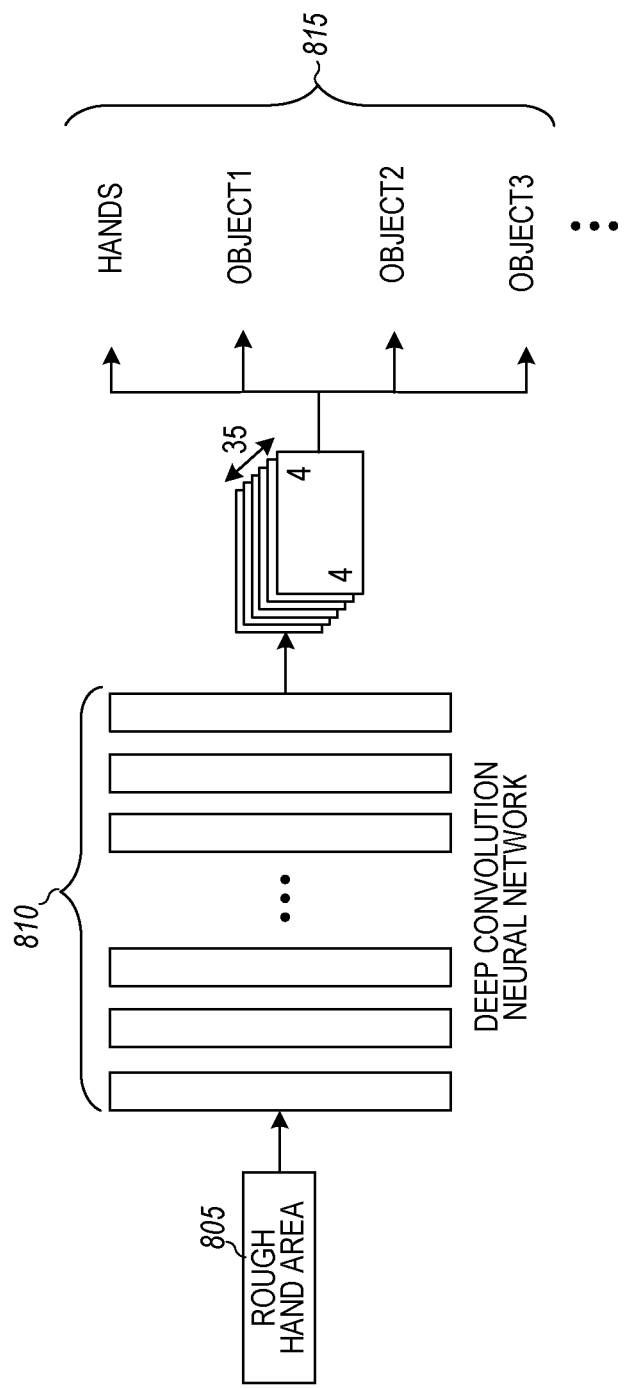

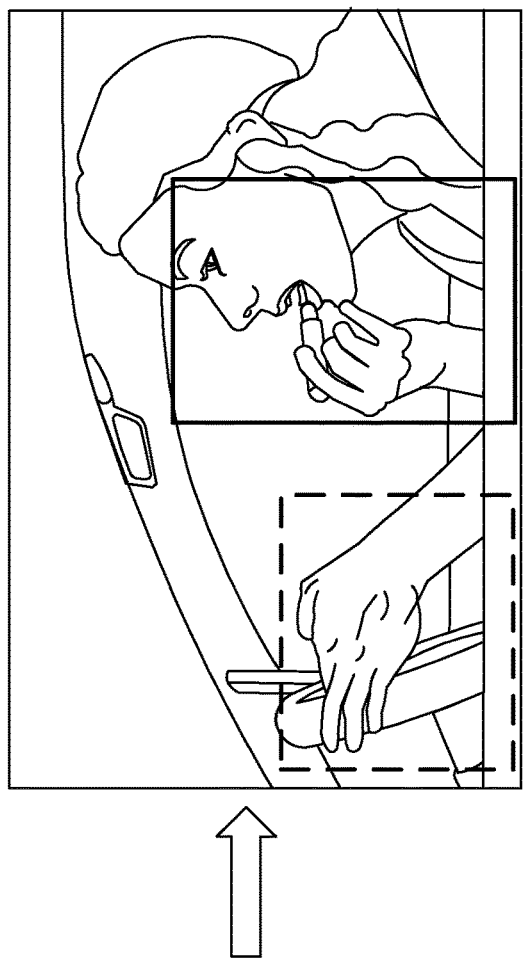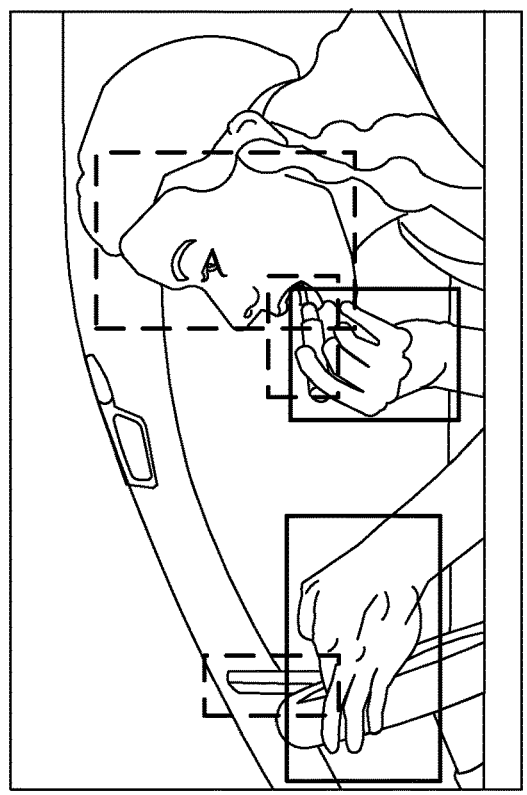
FIG. 10

(A)　　　　　　　　　(B)

ACTIVITY RECOGNITION METHOD USING VIDEOTUBES

PRIORITY CLAIM

This application is a continuation of and claims the benefit of priority to U.S. application Ser. No. 15/867,932, filed 11 Jan. 2018, which application is incorporated by reference as if reproduced herein and made a part hereof in its entirety, and the benefit of priority of which is claimed herein.

TECHNICAL FIELD

The present disclosure is related to automated activity recognition, and in particular to an automated driver assistance system.

BACKGROUND

Vehicle perception relates to sensing information around a vehicle related to the operation of the vehicle. Vehicle perception acts as eyes of the vehicle to feed itself with knowledge of what is happening around it. In-cabin perception is an important aspect of vehicle perception because the state and activity of the driver and passengers provide crucial knowledge in terms of assisting the driver driving safely, and in providing an improved human machine interface (HMI). With the awareness of the driver's activities, the vehicle can determine whether the driver is distracted, fatigued, distressed, raged, or inattentive so it may provide alerts or support mechanisms to keep the driver safe from accidents and to improve the comfort level of the driver. Automated activity recognition is an emerging technology. Current activity recognition methods rely heavily on powerful computing resources that can consume a large amount of energy while occupying a large amount of space of the vehicle. The present inventors have recognized a need for improved activity detection for vehicle perception.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, there is provided a computer implemented method of machine recognition of an activity. The method comprises obtaining a video stream of a first object and a second object using a video source; selecting portions of image frames of the video stream based on presence of a first object in the portions; determining areas within the portions of the image frames that bound locations of the first object; determining a motion of the first object and locations of the second object within the determined areas; identifying an activity using the determined motion of the first object and locations of the second object; and generating one or both of an audible alert and a visual alert according to the identified activity.

Optionally, in the preceding aspect another implementation of the aspect provides obtaining a video stream of an image using a video source, and generating a videotube using the video stream using one or more processors. The videotube includes rearranged portions of the image frames that include an image of a human hand. The videotube can be reconstructed from a given video stream around the activity active areas. An activity active area may include a combination of hands, objects, and the pixels of interest that enable detecting the type of activity. The videotube may include multiple windowed, processed, rearranged regions of video frames and corresponding features such as motion, gradient, and object heatmaps. The combination of all of these regions and computed feature images can be normalized, scaled and rearranged into a scalable tensor video structure and into a temporal structure. The method further includes determining a hand motion, or gesture, and a heatmap using the hand image, identifying an activity using the determined hand motion and heatmap, and generating one or both of an audible alert and a visual alert according to the identified activity.

Optionally, in any of the preceding aspects another implementation of the aspect provides that generating a videotube includes: receiving a first image frame and a subsequent second image frame of the video stream; determining a similarity score between a first windowed portion of the first image frame and the first windowed portion of the second image frame, wherein the videotube is positioned in the first windowed portion of the image frames; omitting processing of the first windowed portion of the second image frame when the similarity score is greater than a specified similarity threshold; and when the similarity score is less than the specified similarity threshold, triggering hand detection in the second image frame to generate a second windowed portion of the image frames more likely to include the hand image than other portions of the image frames, and including the second windowed portion of the image frames in the videotube.

Optionally, in any of the preceding aspects, another implementation of the aspect provides that generating a videotube includes recurrently determining a window size of the videotube, wherein the window size is minimized to completely include the hand image.

Optionally, in any of the preceding aspects, another implementation of the aspect provides that determining a hand motion in the hand area of the videotube includes identifying pixels that include the hand image, and tracking the change in pixels that include the hand image between the image frames of the video stream; and wherein the videotube includes hand motion information.

Optionally, in any of the preceding aspects, another implementation of the aspect provides that generating the videotube includes generating a videotube that includes a collection of rearranged portions of the image frames of the video stream that include hands, objects of interest, and corresponding feature maps.

Optionally, in any of the preceding aspects, another implementation of the aspect provides a method further including determining object information in the videotube, wherein the object information includes a heatmap of the object; and wherein associating the activity includes determining the activity using the object information and the determined hand motion.

Optionally, in any of the preceding aspects, another implementation of the aspect provides that identifying an activity using the determined hand motion or gesture includes applying the object information and the hand motion information obtained from the videotube as input to a machine learning process performed by the processing unit to identify the activity.

Optionally, in any of the preceding aspects, another implementation of the aspect provides that obtaining a video stream of an image includes obtaining a video stream of an image of a vehicle compartment using an imaging array of the vehicle; and wherein generating a videotube includes generating a videotube by a vehicle processing unit using the video stream of the image of the vehicle compartment.

According to another aspect of the present disclosure, an activity recognition device comprises a port configured to receive a video stream from a video source; a memory configured to store image frames of the video stream; and one or more processors. The one or more processors execute instructions stored in the memory. The instructions configure the one or more processors to select portions of the image frames based on presence of the first object; determine areas within the portions of image frames, wherein locations of the first object in the video frames are bounded by the determined areas; determine motion of the first object and locations of a second object within the areas of the image frames; and identify an activity according to the determined motion and locations of the second object, and generate an alert according to the identified activity.

Optionally, in any of the preceding aspects, another implementation of the aspect provides one or more processors that include a global region of interest (ROI) detector component configured to generate a videotube using the image frames; a dynamic activity active area (AAA) generator component configured to detect portions of image frames that include a hand of a person, wherein the videotube includes rearranged AAAs; a key feature generator component configured to determine a hand motion and a heatmap using the hand area; and an activity recognition classifier component configured to identify an activity according to the determined hand motion, and generate an alert according to the identified activity. The key feature generator component may use heatmaps of identified objects to determine the hand motion.

Optionally, in any of the preceding aspects, another implementation of the aspect provides a global ROI detector component configured to: determine a similarity score between a first windowed portion of a first image frame and the same first windowed portion of a second image frame, wherein the videotube is included in the first windowed portion of the first and second image frames; omit processing of the first windowed portion of the second image frame when the similarity score is greater than a specified similarity threshold; and when the similarity score is less than the specified similarity threshold, perform hand detection in the second image frame to generate a second windowed portion of the image frames of the video stream more likely to include the hand image than other portions of the image frames, and include the second windowed portion of the image in the videotube.

Optionally, in any of the preceding aspects, another implementation of the aspect provides a dynamic activity active area (AAA) generator component configured to recurrently set a window size of the videotube, wherein the window size is minimized to completely include the hand image.

Optionally, in any of the preceding aspects, another implementation of the aspect provides a dynamic AAA generator component configured to: determine a center of a hand area that includes the hand image; identify a search area by scaling a boundary of the hand area with respect to the determined center; perform hand detection in the identified search area; and set the size window according to a result of the hand detection.

Optionally, in any of the preceding aspects, another implementation of the aspect provides a dynamic AAA generator component configured to: determine a center of a hand area that includes the hand image; identify a search area by scaling a boundary of the hand area with respect to the determined center; perform hand detection in the identified search area; and set the size window according to a result of the hand detection.

Optionally, in any of the preceding aspects, another implementation of the aspect provides a dynamic AAA generator component configured to: use the determined hand motion to predict a next window; perform hand image detection using the next window; replace the current window with the next window when the next window contains the boundaries of a detected hand image; and when the boundaries of the detected hand image extend beyond the next window, merge the current window and the next window; identify a hand image in the merged windows; and determine a new minimized window size that contains the identified hand image.

Optionally, in any of the preceding aspects, another implementation of the aspect provides a key feature generator component configured to identify pixels in the hand area that include a hand image; and track the change in pixels that include the image of the hand between the windowed portions of the image frames to determine the hand motion.

Optionally, in any of the preceding aspects, another implementation of the aspect provides a key feature generator component configured to determine locations of fingertips and joint points in the image frames; and track the change in fingertips and joint points between the windowed portions of the image frames to determine the hand motion.

Optionally, in any of the preceding aspects, another implementation of the aspect provides a videotube that includes a collection of rearranged portions of the image frames of the video stream that include hands, objects of interest, and corresponding feature maps.

Optionally, in any of the preceding aspects, another implementation of the aspect provides a key feature generator component configured to identify an object in the videotube; and identify the activity using the identified object and the determined hand motion.

Optionally, in any of the preceding aspects, another implementation of the aspect provides an activity recognition classifier component configured to compare a combination of the identified object and the determined hand motion to one or more combinations of objects and hand motions stored in the memory; and identify the activity based on a result of the comparison.

Optionally, in any of the preceding aspects, another implementation of the aspect provides an activity recognition classifier component configured to: detect a sequence of hand motions using image frames of the videotube; compare the detected sequence of hand motions to a specified sequence of hand motions of one or more specified activities; and select an activity from the one or more specified activities according to a result of the comparing.

Optionally, in any of the preceding aspects, another implementation of the aspect provides a key feature generator component configured to store videotube information in the memory as a scalable tensor videotube; and wherein the activity recognition classifier component is configured to apply the scalable tensor videotube as input to a deep learning algorithm performed by the activity recognition classifier component to identify the activity.

Optionally, in any of the preceding aspects, another implementation of the aspect provides an activity recognition classifier component configured to select a row-wise configuration of AAAs within the scalable tensor videotube according to the identity of the person and apply the selected row-wise configuration of AAAs as the input to the deep learning algorithm to identify the activity of the person.

Optionally, in any of the preceding aspects, another implementation of the aspect provides an activity recognition classifier component configured to select a column-wise configuration of AAAs within the scalable tensor videotube according to identities of multiple persons and apply the selected column-wise configuration of AAAs as the input to the deep learning algorithm to identify an interactivity between the multiple persons.

Optionally, in any of the preceding aspects, another implementation of the aspect provides an activity recognition classifier component configured to select multiple column-wise configuration of AAAs within the scalable tensor videotube according to identities of multiple groups of persons and apply the selected multiple column-wise configuration of AAAs as the input to the deep learning algorithm to identify multiple interactivities between the multiple groups of persons.

Optionally, in any of the preceding aspects, another implementation of the aspect provides a video source that includes an imaging array configured to provide a video stream of an image of a vehicle compartment; and wherein the processing unit is a vehicle processing unit configured to generate the videotube using the video stream of the image of the vehicle compartment.

According to another aspect of the present disclosure, there is a computer-readable storage medium including instructions, that when performed by one or more processors of an activity recognition device, cause the activity recognition device to perform acts comprising: obtaining a video stream of an image using a video source; selecting portions of image frames of the video stream based on presence of a first object in the portions; determining areas within the portions of the image frames that bound locations of the first object; determining a motion of the first object and locations of the second object within the determined areas; identifying an activity using the determined motion of the first object and locations of the second object; and generating one or both of an audible alert and a visual alert according to the identified activity. Optionally, the computer-readable storage medium is non-transitory.

Optionally, in any of the preceding aspects, another implementation of the aspect includes a computer-readable storage medium including instructions that cause the activity recognition device to perform acts including: generating a videotube using the video stream, wherein the videotube includes rearranged portions of image frames of the video stream that include a hand image; determining a hand motion and a heatmap using the hand image; associating an activity with the determined hand motion and heatmap; and generating one or both of an audible alert and a visual alert according to the activity.

Optionally, in any of the preceding aspects, another implementation of the aspect includes a computer-readable storage medium including instructions that cause the activity recognition device to perform acts including: recurrently determining a window size of the videotube, wherein the window size is minimized to completely include the hand image.

Optionally, in any of the preceding aspects, another implementation of the aspect includes a computer-readable storage medium including instructions that cause the activity recognition device to perform acts including: predicting a next window using the determined hand motion to; performing hand image detection using the next window; replacing the current window with the next window when the next window contains the boundaries of a detected hand image; and when the boundaries of the detected hand image extend beyond the next window, merging the current window and the next window; identifying a hand image in the merged windows; and determining a new minimized window size that contains the identified hand image.

BRIEF DESCRIPTION OF THE DRAWINGS

FIG. 8 is an illustration of the more detailed image detection according to example embodiments.

FIG. 10 is an illustration of the triggered process of dynamic windowing according to example embodiments.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to components, which may be software, hardware, firmware or any combination thereof. Multiple functions may be performed in one or more components as desired, and the embodiments described are merely examples. The software may be executed on a digital signal processor, application specific integrated circuit (ASIC), field programmable gate array (FPGA), microprocessor, or other type of processor operating on a computer system, such as a personal computer, server or other computer system, turning such computer system into a specifically programmed machine.

As explained previously herein, automated activity recognition is desirable for such applications as vehicle perception to improve the safety of vehicle operation. Current approaches to activity recognition require complex computations by computing devices that use an inordinately large amount of energy and space of a vehicle.

Figure 1:
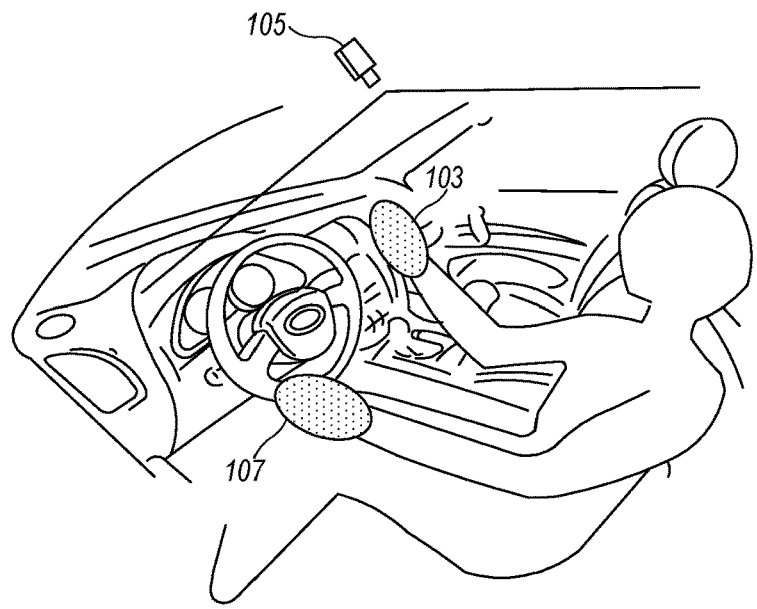
FIG. 1 is an illustration of an occupant in a vehicle cabin according to example embodiments.

FIG. 1 is an illustration of an occupant in a vehicle cabin. As shown in the Figure, occupants of a vehicle cabin often perform different activities using their hands, such as steering or operating the vehicle radio. Hand areas can be used by an activity recognition system as areas on which to focus in order to recognize activities of the occupants. The vehicle cabin or compartment includes an imaging device 105 (e.g., a camera) or array of devices that provide video of an interior view of the vehicle. Hand areas 103 and 107 can be clearly seen from the point of view of the imaging device 105.

The image sensor array 105 of FIG. 1 is connected to a vehicle processing unit (not shown). The vehicle processing unit can include one or more video processors and memory, and the vehicle processing unit runs the activity recognition processes. The image sensor array 105 can capture video of the entire cabin of the vehicle. A region of interest (ROI) component of the vehicle processing unit receives the video stream captured by the image sensor array, and searches through the full image to locate the rough hand area. This global ROI detector uses a classifier/detector that is faster and cheaper in terms of power and complexity to roughly identify whether a detected object is actually a human hand using the corresponding detection confidence.

Videotubes contain local video patches and features generated from the raw video images returned by the imaging device 105. Videotubes can include rearranged portions of the image frames that include the image of a human hand. The videotube can be reconstructed from a given video stream around the activity active areas. An activity active area may include a combination of hands, objects, and the pixels of interest that enable detecting the type of activity. Videotubes may include multiple windowed, processed, rearranged regions of video frames and corresponding features such as motion, gradient, and object heatmaps. The combination of all of these regions and computed feature images can be normalized, scaled and rearranged into a scalable tensor video structure and into a temporal video structure.

For use in automated activity recognition, a videotube is produced from the raw images by removing areas that are not related to the activity of the driver (or the passenger). The videotube can contain several portions of information that describe an activity happening inside a vehicle. Activities inside a vehicle typically involve the hands of the driver and passenger. A videotube can be generated that contains a windowed portion of the original image that contains a human hand and the object with which the hand is interacting. A videotube can also contain the motion profile of the hand (e.g., hand motion flow or hand motion). In some embodiments, the videotube can include a heatmap. A heatmap can be defined as the location of the first object (e.g., a hand) within the determined active activity area. The location information can be represented with respect to a coordinate system centered on the active area or the image frame. Using the image frame coordinates enables the capturing of the relative positions of multiple objects of the first type (e.g., multiple hands visible in a given image).

In some embodiments, a videotube is the collection of rearranged portions of the image frames of the video streams, and can include images of hands, other objects of interest, and corresponding feature maps. In some embodiments, a videotube contains a data structure that can be referred to as a scalable tensor videotube, which is used to organize the information regarding the portions of the original image that include hands and objects, the hand motion profile, and the heatmap of the objects being used by each occupant inside the vehicle cabin.

To generate a videotube, hand area detection is first performed over the raw video streams to locate approximate hand areas in the image data. A more fine-grained hand detector and an activity-oriented objects detector are then run within the approximated hand areas. Bounding boxes of these hand and object locations are determined and merged to generate the videotubes. A full landscape of the hands and objects are contained in the videotubes while the scale of the videotubes is kept as small as possible. For example, a videotube may be generated for FIG. 1 just in the area of the hand operating the radio. Keeping the videotubes as small as possible reduces the amount of image processing needed to be performed to identify activities.

In some embodiments, hand motion (e.g., a hand gesture) can be detected using optical flow processing that is performed only on the videotubes. The optical flow produces temporal information about a hand or the hands of the occupant. The hand motion detection information and the detected object information can be fed into a recurrent neural network (or other automated decision technology) to detect and identify the activities of the occupant. In other embodiments, each hand section of a videotube can be fed into a feature extractor. Temporal information related to extracted features can then be fed into a deep learning based classifier to identify activity.

Figure 2:
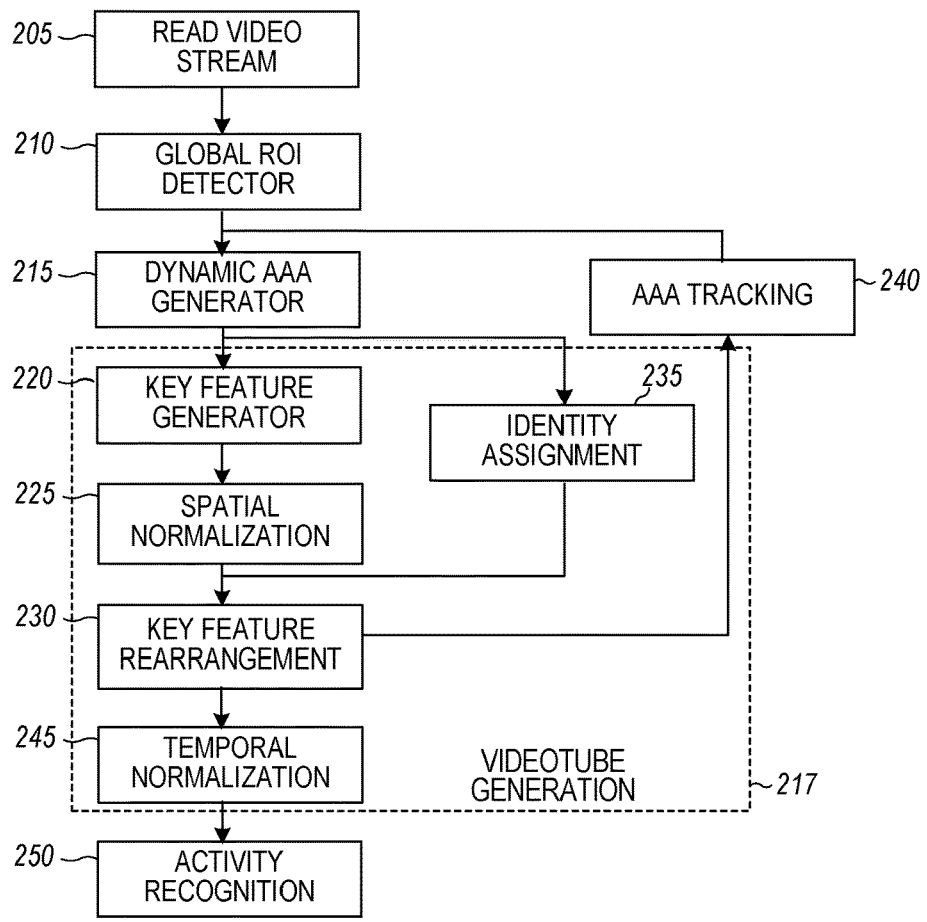
FIG. 2 is flow diagram of a method of machine recognition of an activity according to example embodiments.

FIG. 2 is a high-level flow diagram of a method of machine recognition of an activity. The method 200 may be performed in a vehicle using a vehicle processing unit that can include one or more processors. At operation 205, a video stream of raw images is obtained or read using a video source. The video source can be an imaging device in a cabin of a vehicle (e.g., car, truck, tractor, airplane, etc.). The video stream includes images of a first object and a second object.

The first object may include a hand of an occupant of the vehicle and the second object can include an object with which the hand is interacting (e.g., a smartphone, drinking vessel, etc.).

At operation 210, a global region of interest (ROI) is detected based on the presence of the first object in the images. A ROI detector receives the raw image as input and outputs the rough region of interest. The image frames are processed to detect the first object in the image frames. For detection of activity, the first object may be a hand. Machine learning can be used to recognize features in an image that represent a human hand. The ROI may contain a detected hand area and the surrounding objects within certain range of the hand area.

At operation 215, the activity active area (AAA) within a portion of the image frames is determined. Locations of the first object in the video frames are bounded by the determined areas. The areas are recurrently sized and minimized to reduce image processing needed, yet still include the entire image of the first object. The vehicle processing unit includes an active area generator. The active area generator attempts to achieve minimum window dimensions for generating a videotube while retaining information regarding objects such as hands and activity-related objects. The image processing used to set the active areas bounding the image is more extensive than the image processing used to identify the ROI. When the first object is a hand, the AAA is generated and updated using the locations of hands and objects near the hands by proposing search boxes in different scales and different aspect ratios. The AAA is used to generate a videotube. The videotube is a specific organization of the image data that is optimized for later processing to identify activity.

Videotube generation 217 is performed using operations 220 through 245 of the method 200 of FIG. 2. At operation 220, key features of the videotube (or videotubes) are determined. The vehicle processing unit includes a feature generator. The feature generator determines motion of the first object and locations of a second object within the active areas of the image frames. Determining motion may involve tracking the location of the image of the first object in a previous frame versus the current frame. If the first object is a human hand, the feature generator receives the AAA as input, and may output key features such as hand motion flow information and a heatmap of the second object or objects, which may be objects with which the detected hand is interacting. Because the active areas are optimized by the recurrent window minimization, the image processing required to determine motion is reduced.

At operation 225, spatial normalization is performed. In spatial normalization, a videotube for a specific time "T" is determined using the key feature information obtained at that time "T." This information is then concatenated together and normalized to a dimension where each piece of information can be used as a frame of image and feature data.

At operation 230, key feature rearrangement is performed. In key feature rearrangement, the key feature frames are organized into two structures. The first structure stores the key feature information for multiple occupants of the vehicle. At operation 235, the method may include identity assignment to assign key features to the different occupants. The second structure organizes the key feature frames into a scalable tensor videotube which is described below. Key feature information obtained for a specific time "T" can be one portion of the scalable tensor videotube. At operation 240, image information of the first and second objects (e.g., hand-object information) can be used to re-optimize the AAA; referred to as AAA tracking.

At operation 245, temporal normalization is performed. In some aspects, hand-object pairs and motion information can be concatenated together, and the videotubes can be optimized for objects such as hands in the image frames. But before the generated videotubes can be fed into the activity recognition process, the videotubes should be scaled to the same dimension. The videotubes can be scaled (up or down) in order to obtain a stream of multiple videotubes with the same dimensions (temporal normalization).

At operation 250, activity recognition is performed using the videotubes. The videotubes can be input into an activity classifier. The activity classifier can be a deep learning based classifier that identifies an activity according to the determined motion of the first object and locations of the second object or objects. For example, hand-area videotubes can be input into the activity classifier and hand-object information can be used to identify an activity of an occupant of a vehicle cabin. Because the videotube is a reduced area of processing, less computing power and time is needed for the activity recognition.

The identified activities of the occupant of the cabin of the vehicle can be monitored. An alert can be generated by the vehicle processing unit according to the identified activity. For example, the machine recognition may be included in an automated driver assistance system, and the identified activity may indicate that the driver is inattentive to operation of the vehicle. The alert can be an audible alert generated using a speaker or can be a visual alert generated using a display present in the vehicle cabin. The driver may then take corrective action.

The method of FIG. 2 can be performed by modules of the vehicle processing unit. The modules can include or be included in the one or more processors such as a microprocessor, a video processor, a digital signal processor, ASIC, FPGA, or other type of processor. The modules can include software, hardware, firmware or any combination thereof to perform the operations described.

Figure 3:
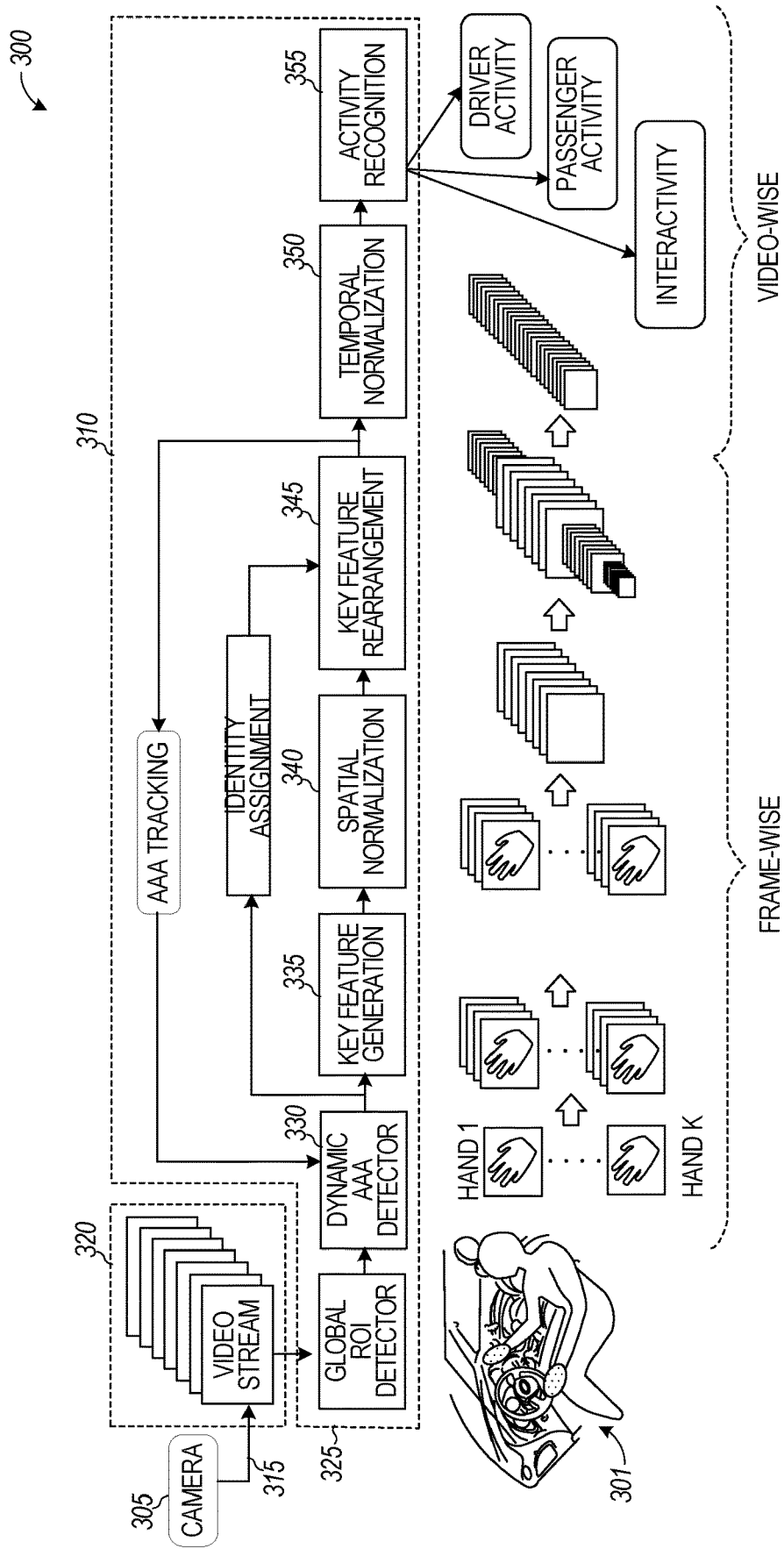
FIG. 3 is a block diagram of a system for activity recognition according to example embodiments.

FIG. 3 is a block diagram of an example of a system for automated activity recognition. In the example of FIG. 3, the system 300 includes an activity recognition device 310 and a video source 305 operatively coupled to the activity recognition device 310. The video source 305 can include a near infrared (NIR) camera or array of NIR cameras and generates a video stream that includes frames of image data.

The system 300 in the example of FIG. 3 is included in a vehicle 301 and the activity recognition device 310 can be a vehicle processing unit. In some embodiments, the activity recognition device 310 can include one or more video processors. The activity recognition device 310 includes a port 315 that receives the video stream and a memory 320 to store the image frames of the video stream. The activity recognition device 310 can include one or more video processors to process the image frames to perform machine recognition of activity using the video stream.

The activity recognition device 310 includes a global ROI detector component 325, dynamic AAA detector component 330, a key feature generator component 335, a spatial normalizer component 340, a key feature rearrangement component 345, and a temporal normalizer component 350, and an activity recognition classifier component 355. The components can include or be included in one or more processors such as a microprocessor, a video processor, a digital signal processor, ASIC, FPGA, or other type of processor. The components can include software, hardware, firmware or any combination of software, hardware, and firmware.

Figure 4:
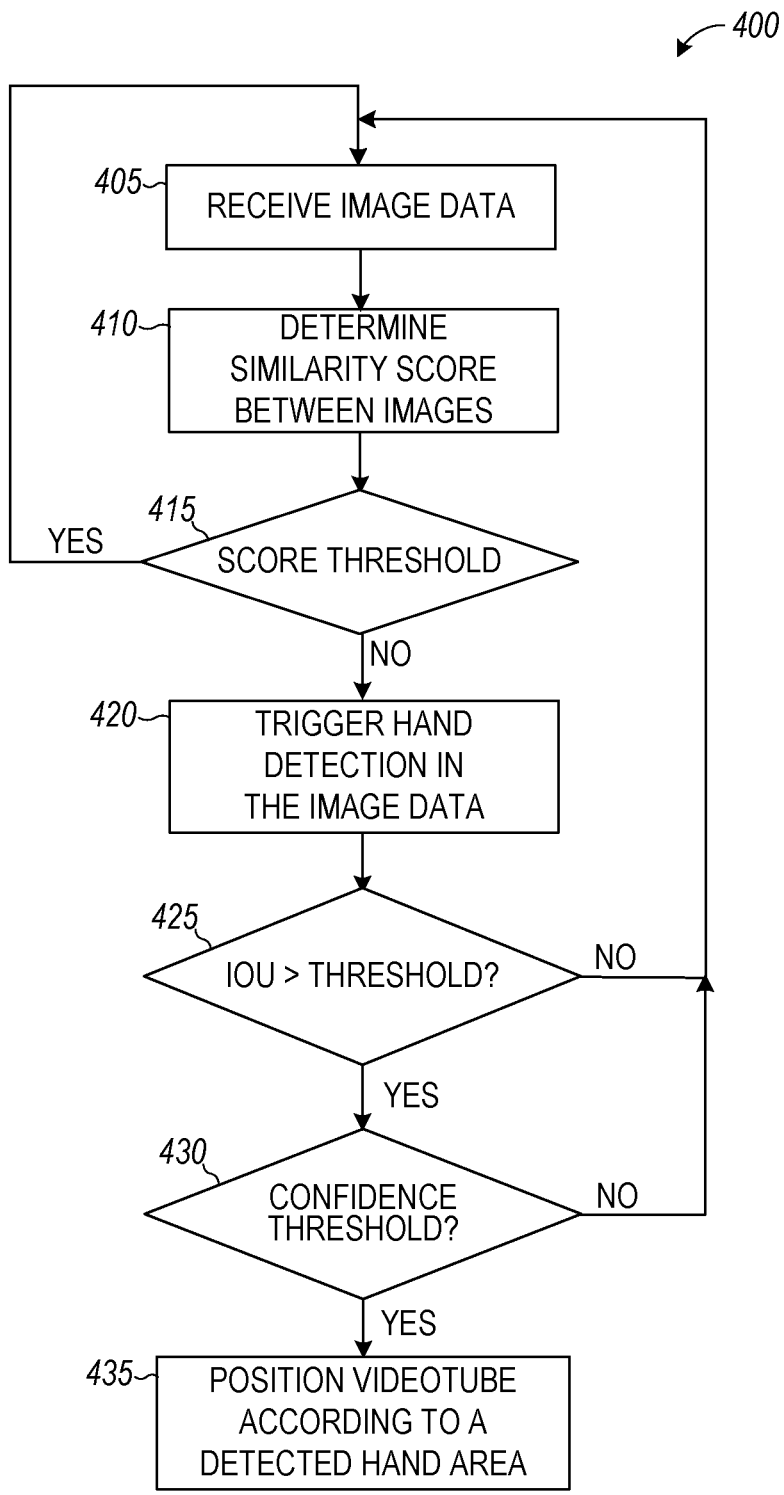
FIG. 4 is a flow diagram of a machine or computer-implemented method for detection of a global region of interest in image data according to example embodiments.

FIG. 4 is a flow diagram of an example of a machine or computer-implemented method for detection of a global region of interest (ROI). The global ROI is an approximate or rough hand area of the image data from the video stream. The method 400 can be performed using the global ROI detector component 325 of the activity recognition device 310 in FIG. 3. The global ROI detector component 325 selects portions of the image frames based on presence of the first object, such as a hand for example. The detection by the global ROI detector component is a rough or approximate detection of the first object. The rough detection of the presence of the first object is applied to a large are of the image frames. The rough image detection can be a fast objectness detection that uses an image level similarity method to detect the presence of the first object. The global ROI detector component 325 receives the raw image data as input and outputs the global ROI. The global ROI may contain a hand area and the surrounding objects within certain range of the hand area.

At operation 405, raw image data is received from the video source or retrieved from memory. The raw images can be color, gray level, near infrared, thermal infrared, etc., are acquired from an image sensor array. The image data includes a first image frame and a subsequent image frame of the video stream.

These images are masked with a global region of interest (ROI) that can be learned offline for specific camera setups using 3D information. The global ROI defines the portion or portions of the image frames where salient and important objects for action and activity recognition, such as hands, human body, and objects exist. In a vehicle, the global ROI refers to areas of the vehicle cabin where the hands of the occupants (including driver and passengers) are potentially visible in the video images. In other words, the global ROI contains all possible hand areas and the surrounding objects within certain range of the hand areas. This allows hands that are outside the vehicle, e.g. behind the front and rear windshields or far away from the side windows, to be excluded from the processing to identify activity.

The global ROI is used to select the areas where consecutive processing will be applied. By determining whether the global ROIs of the consecutive images have a high similarity score (this score can be obtained, for instance, by using a change detection techniques or a logistic regression method) it is also possible to use the global ROI to skip very similar images in order to speed up the activity recognition process by focusing only on video images that are different. Such a similarity threshold is manually set or automatically learned from the data. This threshold can be used to control the number of frames to skip (this can help the better use computational resources available). The global ROI can also be extracted using deep learning based objectness detectors that also extract features to represents the salient and important objects in different shapes, colors, scales, and poses. Using the objectness detectors and a given training dataset, objectness scores for all image pixels in the training images and corresponding bounding boxes are obtained and aggregated into a spatial map, and the spatial map is used to set the global ROI.

At operation 410, the similarity between image frames is determined. In some embodiments, the global ROI detector component 325 includes a spatial constraint component (not shown). The raw image frames are fed into the spatial constraint component which may use a similarity estimation algorithm to determine a similarity score for the images. In the similarity estimation, similar images are given a higher similarity score. The similarity score may reflect global similarity between the first image and the second image or may reflect similarity between a first windowed portion of the first image frame and the first windowed portion of the second image frame. In certain embodiments, logistic regression is used to determine the similarity score for the images. In variations, the output of the logistic regression is binary and the images are either deemed similar or not similar.

At operation 415 of FIG. 4, the similarity estimation skips images that are indicated to be similar according to the similarity score in order to speed up hand detection in the images. The similarity score threshold that determines to skip an image may be manually specified (e.g., programmed) or can be learned by the activity recognition device from training data. The number of frames skipped or omitted in the hand detection processing is determined by the similarity score threshold. The initial similarity score may be blanked or set to zero so when the first image is received in order to trigger an initial detection for the first object.

Figure 5:
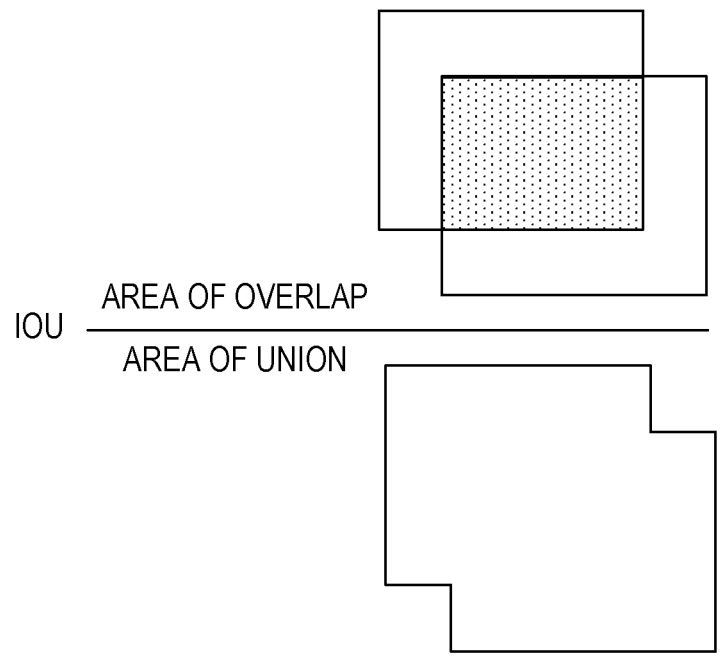
FIG. 5 is an illustration of image over union for imaging processing windows according to example embodiments.

At operation 420, if the similarity score between the two image frames is below the specified similarity threshold, hand detection is triggered and performed in the second image frame. The global ROI detector may include a machine learning component to perform the object detection. The machine learning component may utilize deep learning technology (e.g., convolutional neural networks (CNN), recurrent neural networks (RNN), or long/short term memory (LSTM)) to learn to recognize features in an image that represent the first object of interest. In some aspects, these image features can include different shapes, colors, scales, and motions that indicate a hand. The output of the hand detection can be a confidence of detection with respect to one or both of category and type. The confidence of detection may be a probability of correct detection. The output of the detection of the first object is also a bounding box that defines the boundary of the object detection. The bounding box can be used to calculate intersection over union in the image area. FIG. 5 is an illustration of image over union (IoU) for imaging processing windows, where IoU=(Area of Intersection)/(Area of Union).

Returning to FIG. 4 at operation 425, the IoU and Confidence are used to determine if the results of the image detection are trustable. Thresholds for IoU and Confidence can be specified manually or determined using machine training as for the similarity score threshold. If either of the IoU or confidence does not satisfy the threshold, the image is skipped and the method returns to 405 to acquire the next image for the analysis. At 435, the global ROI is set for the frames of image data. The output of the bounding boxes is treated as the initial global ROI for the videotube.

Returning to FIG. 3, the activity recognition device 310 includes a dynamic activity active area detector component 330 to determine an activity active area (AAA) using the global ROI determined by the global ROI detector component 325. The AAA is used in determining the image area of the actual videotube. Locations of objects of interest (e.g., hands) in the video frames are bounded by the determined areas. The dynamic AAA detector component 330 attempts to achieve minimum window dimensions for the videotube while retaining the information related to hands and the activity-related objects.

Figure 6:
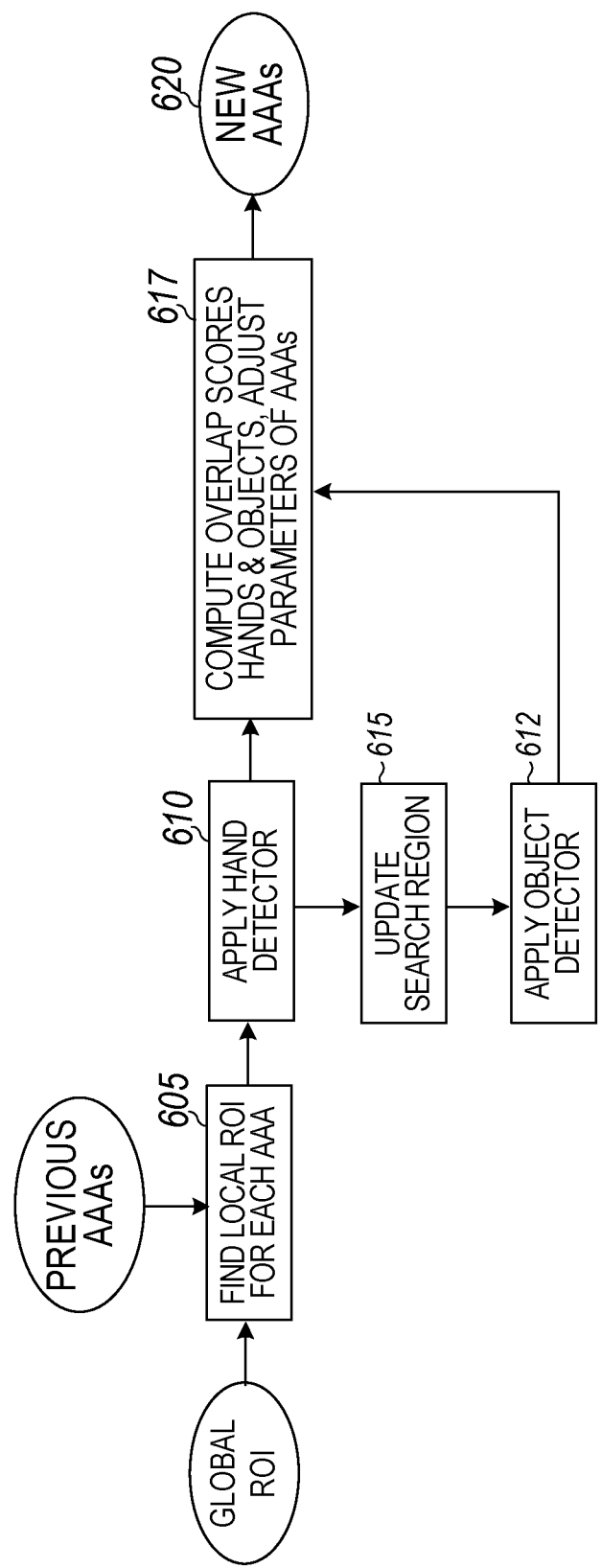
FIG. 6 is a flow diagram of a computer-implemented method for detection of a hand in image data according to example embodiments.

FIG. 6 is a flow diagram of a method of determining the AAA. At operation 605, the global ROI and previous Activity Active Areas (AAAs) are combined in order to find a local region of interest for each AAA. The local ROI is used to determine the search area and it is derived from the previous AAA after tracking them within the global ROI. The local ROI has larger size than its AAA to ensure a full detection of hands and surrounding objects. Search areas or boxes can be used to locate the objects of interest in the global ROI. In some embodiments, search boxes of different scales and aspect ratios are proposed as search areas. Based on the determined approximate object area of the global ROI, search areas in different scales and aspect ratios (or length-width ratios) are generated. In some aspects, a pre-defined set of scales and length-width ratios can be used to multiply the bounding box of a hand area to generate search boxes. This pre-defined set can be either manually set based on experience or automatically learned from original data, such as by a clustering method for example. Hands and objects detection can be performed on these generated search areas.

Figure 7A:
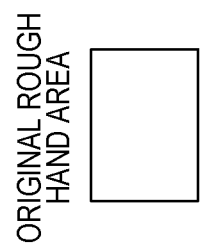
FIGS. 7A-7D illustrate setting search windows for hand detection according to example embodiments.
Figure 7B:
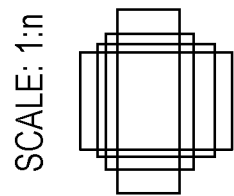
Figure 7C:
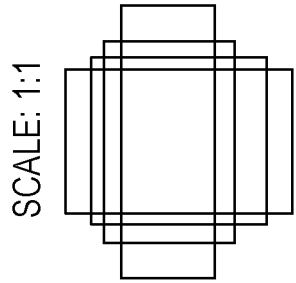
Figure 7D:
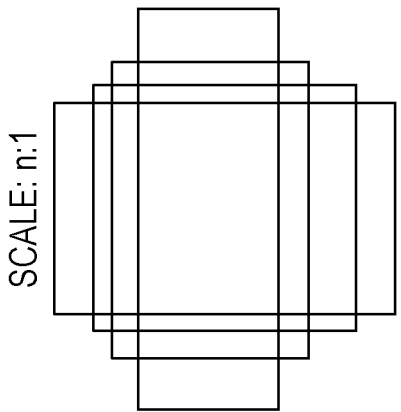

FIGS. 7A-D illustrate determining search windows or search boxes for hand and object detection. FIG. 7A represents the initially identified approximate area of the first object. In some aspects, the center of the initial hand area is determined and the size of the window of the hand area is scaled with respect to the center to identify a search area. FIG. 7B is an example of reducing the scale of the initial search area while changing the length and width of scaled windows. The scale of the windowing is reduced by 1 to n, with n being a positive integer. FIG. 7C is an example of maintaining the scale of the initial search area, and FIG. 7D is an example of expanding the scale of the initial search area. The scaling used can be pre-defined and specified manually or the scaling can be determined by machine training. For example, the scaling can be machine learned from initial data using a clustering method.

Returning to FIG. 6, detection at operation 610 can be performed in the proposed search area to identify an image of the first object. At operation 612, the search region can be updated based on the result of the hand detection. At operation 612, object detection at operation 612 can be performed in the search area, such as to identify objects with which a detected hand may be interacting. This iteration of image detection of the first object is more detailed than the rough search area detection described previously herein. The window size of the videotube can be minimized by reducing the size of the window based on the result of the image detection. In some aspects, a hand detector is applied in the local ROI to find the locations of the hand in the current video frame (image). Each AAA can correspond to a single hand (e.g., an AAA is based on a hand region).

FIG. 8 is an illustration of an example of the more detailed image detection. In some aspects, an approximate or rough area of a hand 805 and the resized search area window are input into a deep convolution neural network 810. The deep convolution neural network 810 may be a deep learning based image detector that is trained for detection of hands and objects 815 within the resized windows. In certain embodiments, the deep learning based image detector is trained for detection of hands and objects with respect to activities that take place in a vehicle cabin.

This detailed version of hand and object detection can be computationally intensive. However, the detailed hand detection operates within the boundary of the search area windows, which reduces the area of the image to be processed to identify a hand or object. This can speed up detection, but can also reduce the focus of the detection to an area with a higher probability of containing a hand, which reduces the possibility of misdetection. Additionally, the spatial constraint component of the global ROI detector can determine (e.g., using logistic regression) when processing of an image can be skipped based on image similarity.

The rough or approximate image detection used by the global ROI detector component identifies and selects portions of an image that may contain an object of the first type (e.g., a human hand for the activity recognition task in a vehicle). This is followed by a more detailed, accurate, yet potentially more computationally intensive object detection by the AAA detector component. The two-stage hand detection process decreases the overall computational load and improves the detection accuracy by allowing the detector to focus on the areas that are more likely to include hands. The rough image detection is fast, computationally inexpensive, and is applied to a large portion of the image, and preferably has a low false negative rate (i.e., it does not miss any of the true hand areas, yet it may incorrectly identify or select non-hand areas as hands). In contrast, the detailed object detection has a low false positive rate (i.e., it correctly identifies non-hand areas that may have been incorrectly identified by the rough image detection). Additionally, the rough image detection may not be accurate when it comes to the window size of the hand region.

Considering these tradeoffs, the rough image detection can be a fast objectness (e.g., human hand) detection that uses an image level similarity method such as one or more of a logistic regression, a tracking algorithm, a conventional classifier (that uses simple region descriptors and traditional classification methods such as support vector machines, boosting, random trees, etc.), and a deep learning based classifier. The detailed object detection can be a conventional classifier as well as a deep learning based classifier. In case both the rough image detection and the detailed object detection use deep learning models, the rough image detection might be operating at a lower spatial resolution, using only initial layers of the deep architecture (e.g., first few convolutional layers connected to a fully connected layer), trained as a binary classifier without estimating the object window size, or a combination of all of these. The detailed object detection can use the feature maps generated by the rough image detection, use much deeper processing layers, and regress the object window size in addition to serving as a binary classifier The detailed hand detection may not always guarantee correct results. In some embodiments, the dynamic AAA detector component 330 may apply the results of the detailed image detection to a false detection filter designed to get rid of false positive and negative detections, or to determine missed detections. This can result in consistent categories for the same hand and objects detected and provide reliable information for activity recognition. New detected locations of hands and objects are updated based on valid categories of hands and objects.

Windows of videotubes are dynamically sized and search regions are updated based on the first object and second object detection. The detected location of the first may be used to update the search region for detecting surrounding objects. For different applications, AAA can be based on different objects, including human body, face, legs, animals, etc. As part of generating a videotube, the video processor attempts to minimize the resolution of the video tube to minimize the amount of image processing needed to identify an activity. The window size of the video tube is recurrently determined to find a window size that is minimized but still includes the identified first object area. In some embodiments, the window size is recurrently determined according to the example method shown in FIGS. 7A-7D. The window size is recurrently updated based on the determined approximate areas, and search areas or windows of different scales and length-to-width ratios are generated.

Returning to FIG. 6 at operation 617, overlap scores between the corresponding hand box and each surrounding objects can be computed for each detected hand. The IoU (Intersection over Union) as shown in FIG. 5 may be used to measure the overlap area between two bounding boxes. However, surrounding objects are usually occluded by the hand so only partial objects can be detected in many cases, which generates low IoU scores and may be treated as irrelevant objects. Distance between two bounding boxes is another measure to compute the score. However, distance is subject to the bounding boxes' sizes. For example, bounding box A and B has the same distance to C. Only bounding box A should be considered as surrounding object. Therefore, another method to determine bounding boxes is to compute the overlap score that takes both the distance and size of bounding box into account while it's capable of measuring overlap between occluded objects and an image of the hand.

An example of a formula to compute overlap is as follows:

$$\text{Overlap Area} = \frac{(x_{center_{obj}} - x_{center_{hand}})^2}{width_{obj} * width_{hand}} * \frac{(y_{center_{obj}} - y_{center_{hand}})^2}{height_{obj} * height_{hand}}, \quad (1)$$

where $(x_{center_{obj}}, y_{center_{obj}}, width_{obj}, height_{obj})$, and $(x_{center_{hand}}, y_{center_{hand}}, width_{hand}, height_{hand})$ are the object's and hand's bounding box parameter, respectively. Accordingly, the overlap score can be computed as:

$$\text{Overlap Score} = \alpha e^{-\beta \cdot overlap\ area} \quad (2)$$

where $\alpha$ and $\beta$ are preset coefficients.

When the object and hand completely overlap each other, the overlap area achieves the minimum value 0 and overlap score achieves the highest score 1. For an overlap area between 0 and 1, the overlap occurs between the hand and object. When the object and hand has the same size and adjacent to each other, overlap area equals to 1. For an overlap area larger than 1, the overlap score reduces rapidly to 0. The updated equations for the AAA box parameters are defined as:

$$top = s * \min(top_{hand}, top_{obj}) + (1-s) * top_{hand} \quad (3)$$

$$left = s * \min(left_{hand}, left_{obj}) + (1-s) * left_{hand} \quad (4)$$

$$bot = s * \max(bot_{hand}, bot_{obj}) + (1-s) * bot_{hand} \quad (5)$$

$$right = s * \max(right_{hand}, right_{obj}) + (1-s) * right_{hand} \quad (6),$$

where (top, left, bot, right), $(top_{hand}, left_{hand}, bot_{hand}, right_{hand})$, $(top_{obj}, left_{obj}, bot_{obj}, right_{obj})$ are alternative representations of the parameters of the AAA box, hand region, and object region, respectively. The variable s is the overlap score from Equation (2).

Objects without a high overlap score will be obsolete and the updated AAA will remove those objects thereafter. For objects with high overlap scores, their bounding boxes are merged into the AAA.

Figure 9:
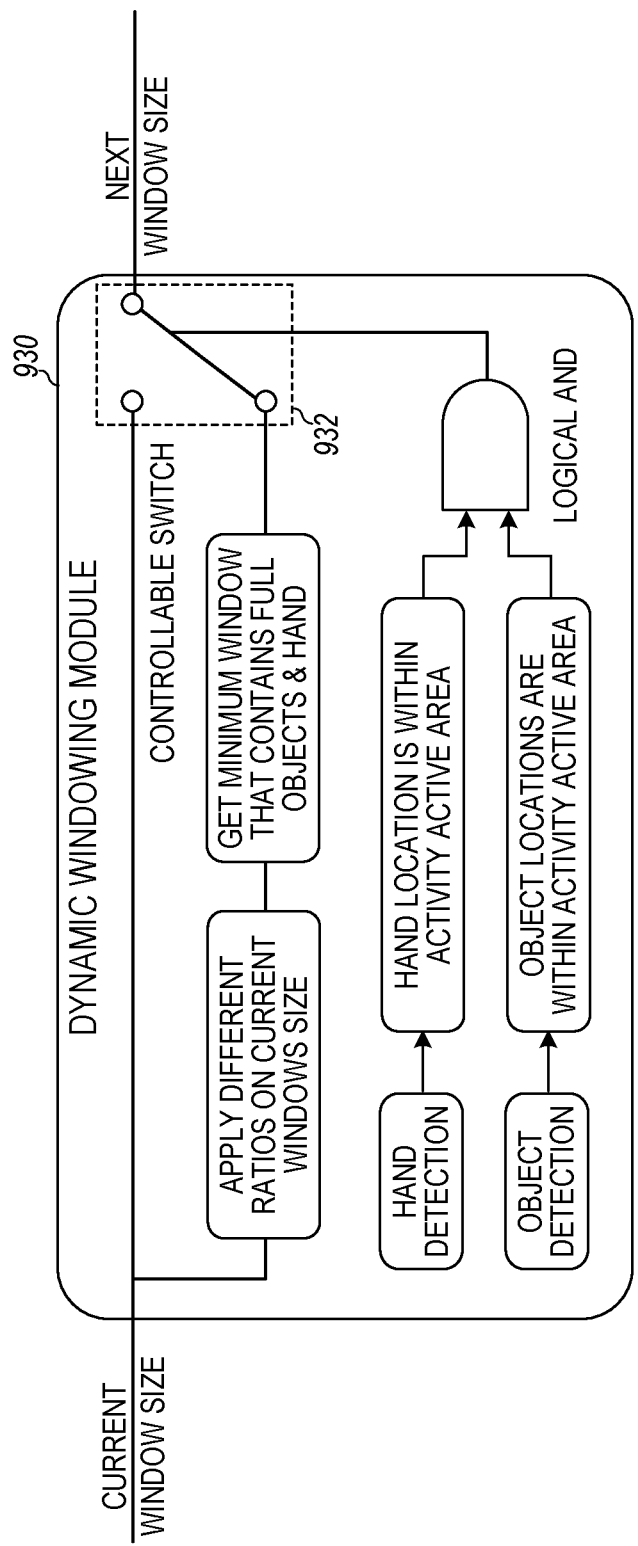
FIG. 9 is a block diagram of a dynamic windowing component according to example embodiments.

Other methods can be used to recurrently update the window size of the videotube. In some embodiments, the dynamic window sizing includes window tracking of the determined hand motion trajectory. FIG. 9 is a block diagram of an example of a dynamic windowing component 930 that may be included in the dynamic AAA detector component 330. Starting with the current window size as input, the dynamic windowing component 930 uses the hand motion trajectory to predict the next window size and location. Hand and object image detection is performed within the predicted window. Bounding windows or boxes are generated to validate whether the predicted new window evolves correctly in size and direction to contain the boundaries of the hand image. If a new predicted window contains all the detected bounding boxes, the dynamic windowing component 930 outputs the new window size as the next window size. The new window size replaces the current window for the videotube in the subsequent image frames. Otherwise, if the boundaries of the detected hand image extend beyond the next window, a reproduction process will be triggered (e.g., by switch 932) which applies a set of pre-defined length-height ratios on the current window.

FIG. 10 is an illustration of an example of the triggered process of dynamic windowing performed using the dynamic windowing component 930. The example shows the windows being changed in size and merged to accommodate the size of the detected object (e.g., the human face) to ensure that all related objects are fully detected. For example, a partially detected face in FIG. 10 may get lost over a period of object detection. Detection of the entire object, rather than a partial object, helps prevent losing track of objects when minimizing the window size. If an object is partially detected, the dynamic windowing component may change the windows using different aspect ratios and sizes to detect the entire object. By merging all bounding boxes of the detected hand and objects, a minimum window that contains the hand and objects of interest is generated as the next frame for processing of the videotubes. The AAA includes all overlapping objects and hands.

Returning to FIG. 6 at 620, the AAA is generated using the windowing and first object detection. The AAA is used to create the actual videotube. In some aspects, the video stream can produce multiple AAAs in which can be organized by hand identity. Each hand may generate one AAA. Each AAA is assigned to the identity of the hand it represents. Objects in an AAA are assigned with and identity label, which is the AAA's identity. Each object can be assigned with more than one identity because frequently objects are exchanged or connected to multiple persons in interactive activities. Information on the object type and hand identity may be recorded in a registry, which retains the relationship between AAAs from entire video stream and these relationships can be recovered later in the scalable tensor videotube (described below in regard to FIG. 17) with the help of the registry.

The AAA can be designed to focus only on human activities, in particular the ones related to hands. Determination of the AAA significantly suppresses the background clutter and irrelevant visual information in images. This makes the activity recognition more resilient and very robust to clutter, noise, and irrelevant details. It also improves the runtime speed of the recognition algorithm thus reducing the need for computing resources, which allows processing on low-cost computing platforms. Even though AAAs are much smaller portions of the videos than image frame, they still keep all necessary and salient information about target activities, in particular the ones involving hands.

AAA has several differences from the ROIs. In computer vision and optical character recognition, the ROI defines the borders of an object under consideration. In contrast, the AAA distinctly defines the borders of a cluster of objects that are salient and related to recognition of activities under consideration. The AAA dynamically adds new objects or remove irrelevant ones depending on the overlap scores and distance criteria with the hand. ROI simply defines an image patch. However, the registry for an AAA contains information in addition to the minimum available pixel area of the object cluster. The registry records the relationship between different AAAs from entire video stream while ROI cannot represent or record such a knowledge.

Key features are then identified in the AAA to provide the contents of the videotube. The key feature generator component 335 of FIG. 3 determines the key features. In some aspects, after the hand region of interest is formulated for each hand in the image data, each hand may receive an identification (hand ID). The hand ID may also identify to which occupant a hand belongs. The key feature generator uses the AAA as input to identify key features.

Figure 11:
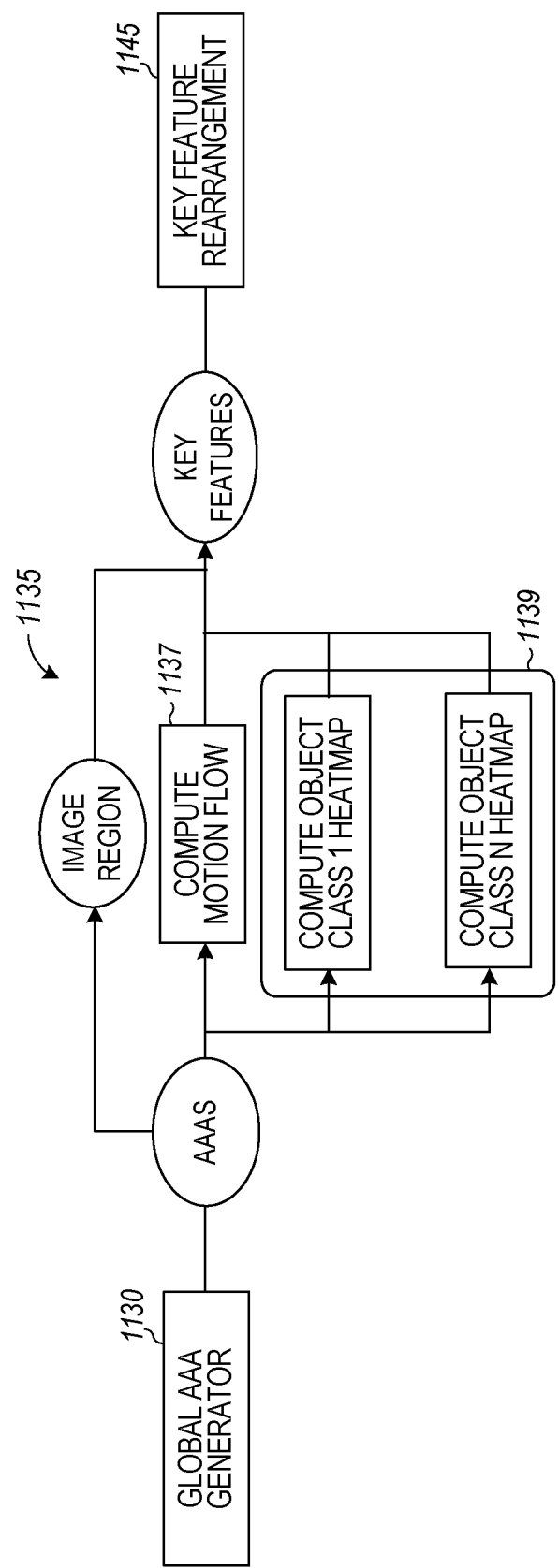
FIG. 11 is a block diagram of portions of the system for automated activity recognition according to example embodiments.

FIG. 11 is a block diagram showing the dynamic AAA generator component 1130, the key feature generator component 1135, and the key feature rearrangement component 1145 of the system for automated activity recognition. The key feature generator component 1135 may include a motion flow component 1137, and a heatmap component 1139.

In some aspects, after the AAA for each hand is determined and each AAA is given an identification (e.g. a hand ID that indicates to which occupant the corresponding hand belongs), the key feature generation component computes the key features for the AAA. The features can include original image (color, intensity, near infrared, etc.) pixel values, object locations, object motion flow, and object heatmaps, and can be arranged into a 3D data structure for each AAA. These features can also be the feature responses of deep neural networks, in particular deep convolutional networks. In this 3D data, first two dimensions are spatial (corresponding to image region) and the third dimension has layers where each layer corresponds to a feature. This can be considered as small AAA sized frames of color, motion, feature responses are concatenated to each other on the third dimension.

There are different processes executed by the key feature generation component 1135. The motion flow component 1137 generates the key feature of motion profile of the hands being tracked in the videotube. The motion profile can provide information regarding the previous and current location of each hand (e.g., the hand location in the previous frame vs. the current frame), as well as how fast the hands are moving. These key features of motion flow can provide temporal information regarding the hands to the system. This temporal information may allow the system to better infer the activity of the hand being tracked. For instance, drinking by an occupant may have a "whole hand" type of global motion, in which the entire hand will move from the cup holder up to a person's face while holding the cup. Conversely, texting with a smartphone may involve a whole hand motion, but the texting might not always involve large motion ranges of the entire hand. Texting might be more related to finger motion than whole hand motion, and texting may be inferred if the motion profile indicates more finger motion than whole hand motion. The motion flow component 1137 may also determine velocity of the hand motion. Knowing information of hand motion and hand velocity allows for improved determination of hand trajectory in the hand tracking, because the information can improve prediction of where the hand is most likely to be located in future image frames.

When the AAA of the videotube is determined, the videotube includes a sequence of images from one or more windowed portions of the image frames of the video stream. The sequence of images of the videotube can be used to determine the motion profile features. In some embodiments, pixels of the image frames that include the hand image are identified in the videotube. The change in the pixels that include the hand image may be tracked by the motion flow component 1137. Tracking the change in those pixels that include the hand between image frames of the sequence can provide knowledge of the direction of the moving hand at the pixel level. Limiting the tracking to the videotube reduces the processing necessary to track the change in pixels. This tracking can be referred to as optical flow. The optical flow provides information for each fingertip and joint points which can be fed into an activity recognition network to determine activity.

Figure 12:
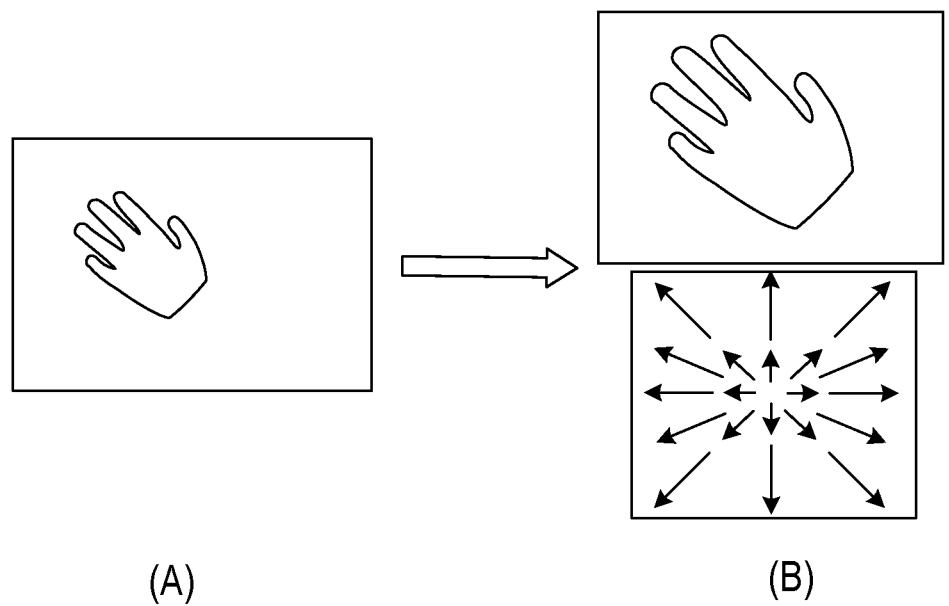
FIG. 12 shows a result of using optical flow to determine motion flow information according to example embodiments.

FIG. 12 shows an example of a result of using optical flow to determine motion flow information. The image on the left represents the original hand image obtained using a depth camera as an image source. The image on the right represents the same hand image after the hand has moved forward toward the depth camera. Below the image on the right is a representation of the motion profile of the hand image in motion. The motion profile can be used to predict the trajectory of the moving hand.

Returning to FIG. 11, the heatmap component 1139 produces heatmap information related to spatial location and types of objects in the videotube that can be used to determine activities of the occupants. The heatmap component 1139 works similar to how a histogram works. A histogram shows a numerical distribution of numerical data. Likewise, the present disclosure utilizes a heatmap to represent the detection distribution of an object or objects with which the hands inside a cabin are interacting with. In the example of FIG. 11, there are K hands and N objects detected in the AAA, where K and N are positive integers.

Assume K=6 and there are six hands detected in a stream of consecutive image frames. Out of these six hands, two are interacting with a smartphone, and one hand is interacting with a drinking cup. Therefore, the heatmap representation will show a higher "heat" distribution for the smartphone than for the cup, because more smartphones were detected in the image frames than cups. The heatmap distribution can help the system in the present disclosure sift through the list of activities that the system can detect. The heatmap distribution can be used to assign probabilities to detected activities. A high heat signature for smartphones means that the activities inside the cabin are more related to "texting" than to "drinking," or "eating," for example. Assigning a higher probability allows the system better detect the activity occurring inside the vehicle.

An object heatmap is a two dimensional (2D) map that represents the likelihood of a specific class of object centered at a pixel. If there is an object centered on the pixel, its heatmap value will be high. Otherwise, the heatmap value is small. The size of the object heatmap is same as the size of the AAA. Each heatmap is a feature layer in the final key features.

Figure 13:
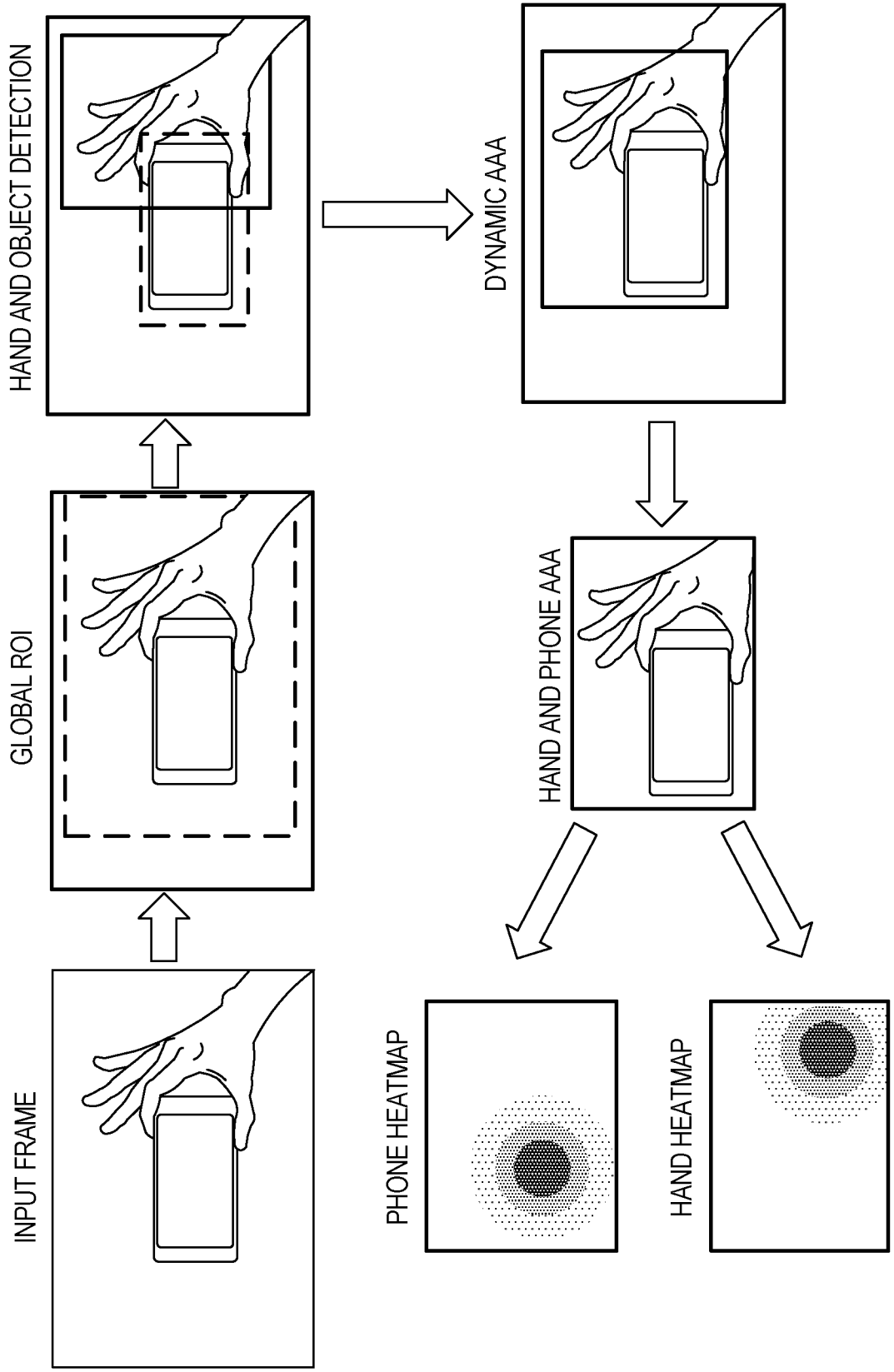
FIG. 13 is an illustration of heatmap generation according to example embodiments.

FIG. 13 is an illustration of heatmap generation. Heatmaps are used to obtain the location probability of where an object is located after multiple detections of the same object are obtained. A phone heatmap 1305 and a hand heatmap 1310 are shown in FIG. 13. The spots in the heatmap are the hotter spots that may represent the location where the detected object is more likely be located at after multiple detections have been performed.

The heatmap component computes a probability density or a histogram. A histogram demonstrates a numerical distribution of numerical data. Likewise, the present disclosure utilizes a heatmap to represent the detection distribution of an object or objects with which the hands inside a cabin are interacting with. For example, let say there are multiple hands detected in a stream of consecutive frames. Out of these hands, two are interacting with a smartphone, and one hand is interacting with a cup. Therefore, the smartphone heatmap will show a higher heat responses, i.e. larger heatmap values, for the pixels of the smartphone areas and the cup heatmap will show higher responses for the pixels of the cup.

Multi-object heatmaps can be embedded as part of the videotubes in order to better track and localize objects, as well as to help the system assign probabilities to the activities that are more likely to happen based on the objects near the hand. Heatmaps are obtained directly after the hand and object detectors. They can be computed afterwards within only the AAA as well.

The 2D heatmaps that correspond different object classes (including hand, face, smartphone, book, water container, food, and many others) can be arranged into a 3D data structure. Instead of collecting the information over a time interval, the activity recognition system can capture the information at a specific time, and then construct a videotube that represents the instantaneous information. This information contains the hand and object detected, the motion flow information, and the heatmaps of the objects.

The computed heatmap features significantly enhance the activity recognition system by fusing the spatial detection information directly in the appearance features. This is a very efficient way of imposing the detection results of the hand and object detector into the activity classification solution. These heatmaps also allow the system to sift through the list of activities that are predefined in the system, or that the system has already learned. For example, a higher heatmap value for smartphone heatmap means that the activities is more related to "texting" than to "drinking," or "eating". Additionally, heatmaps are also used in order to understand the location distribution of objects that the hand is or will be interacting with. The object heatmaps allow the system to understand the location of the multiple objects relative to the hand location, and allows the systems to also determine the likelihood of the activity the hand is about to perform based on the object location, the object proximity to the hand, and also the object identity.

Apart from the difference between AAA and ROI, key features generated from AAAs also have different contents from ROI. ROI refers to the cropped image patch of interest area. However, key features from AAA are abstracted feature maps like motion flow frames and object heat maps. Also, these key features offer more information on hands and objects in a temporal sequence.

Figure 14:
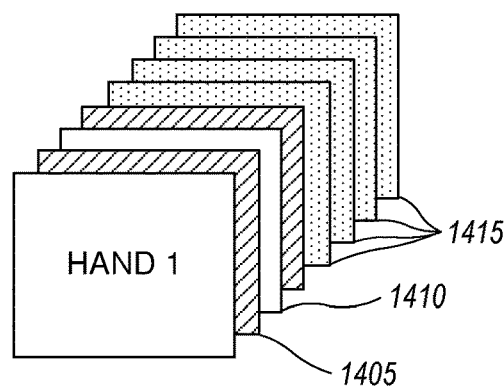
FIG. 14 is an illustration showing key features for a videotube according to example embodiments.

FIG. 14 is an illustration of raw key features of a videotube. The videotube example includes key features of image and motion flow for hand one 1305, image and motion flow for hand two 1410, and a heatmap stream 1415. The raw key feature information is used to generate the videotube.

When the key features are identified using the key feature generator, the spatial normalizer component 340 uses the key feature information obtained at a specific time T to generate a videotube for that specific time T. This key feature information contains the hand and object detected, the motion flow information, and the heatmap of the objects that the system is capable of detecting. This information is then concatenated together and normalized to a spatial dimension where each piece of information can be used as a frame of the videotube.

Figure 15:
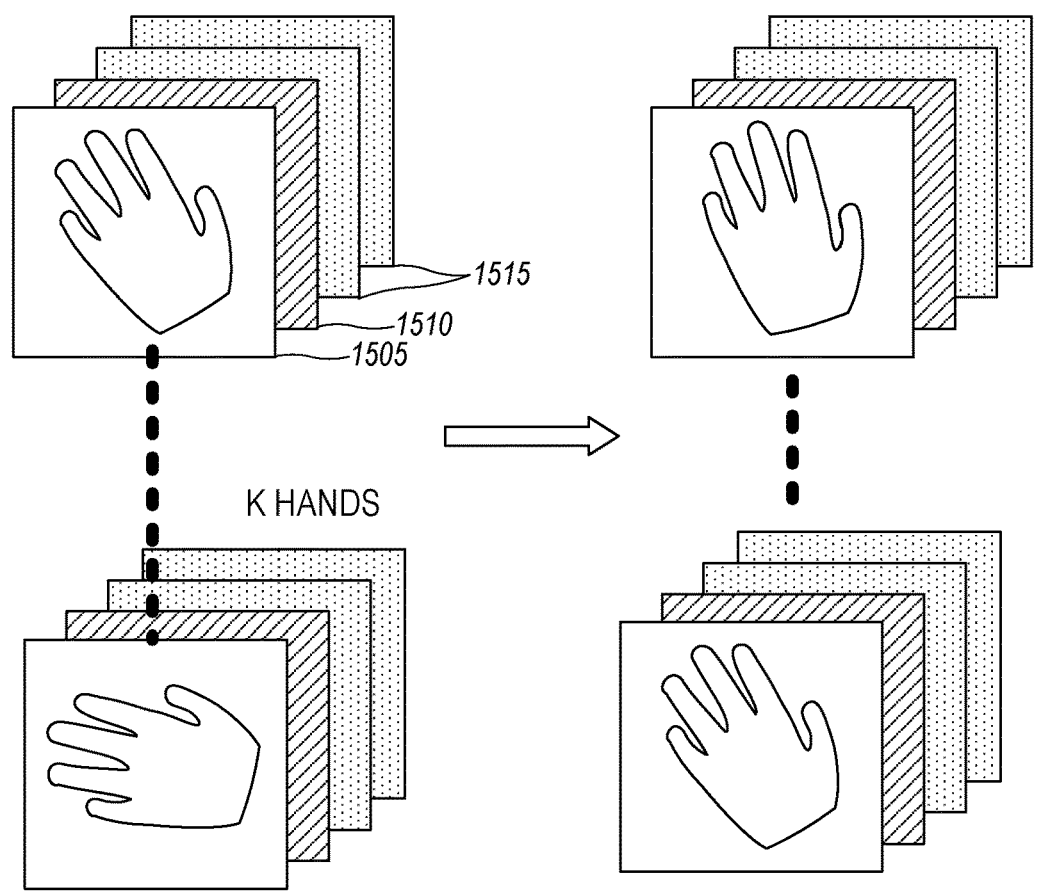
FIG. 15 is an illustration demonstrating normalization of image frames to a spatial dimension according to example embodiments.

FIG. 15 is an illustration demonstrating normalization of image frames to a spatial dimension. On the left are frames for a number "K" of hands and their respective key features that were detected. The key feature frames include a hand image frame 1505 or patch, motion flow information 1510, and heatmap information 1515. The top frame on the left has a different scale than the lower frame on the left. The frames on the right show the frames normalized to the same scale.

The identity information of different occupants can be assigned to the hand sections of key feature frames. Identity assignment can be important to differentiate different hands and the activities of the hands. Identity assignment can be helpful in to recognize and differentiate activities of the driver and passengers. Passengers may be allowed to perform activities that show some distraction without generating an alert.

When all the hand-object pairs and motion information per frame have been concatenated together and the optimized videotubes for each hand are created, the optimized videotubes can be fed into the activity recognition classifier component 355 of FIG. 3. However, some additional scaling and some rearranging of the key feature information can improve the efficiency of the activity recognition computations.

The temporal normalizer component 350 scales all of the generated videotubes to the same dimensions to perform temporal normalization. The reason why the videotubes should be scaled uniformly is because a hand may not always appear in the same location of every frame and may not have the same size on every frame. Some hands may be further away from the image sensors than other hands on each frame. Further, multiple hands may be at the same distance from the mage sensor, but they may have different sizes (e.g., an adult hand vs a child's hand). Therefore, the hand images in the videotubes are scaled (up or down) in order to generate a stream of multiple video tubes with the same dimensions (temporal normalization). Having the same dimensions on all images allows the activity recognition system to concatenate all the videotube frames extracted over time, and then form new video data that contains all the frames from all the videotubes acquired over a specified (e.g., programmed) amount of time.

Figure 16:
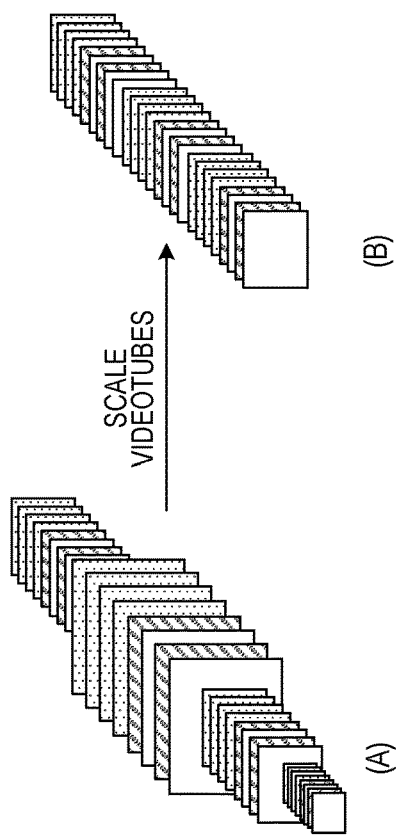
FIG. 16 is an illustration of normalization of video tubes according to example embodiments.

FIG. 16 is an illustration of normalization of video tubes. On the left in FIG. 16 are videotubes of four different scales. On the right the videotubes are shown scaled to the same size. In some embodiments, the temporal normalizer component 350 implements an average size videotube mechanism. In this mechanism, when all videotubes of all hands have been obtained, the average dimension of all the videotubes combined is determined, and all videotubes are scaled to the average dimension.

Returning to FIG. 3, the activity recognition device 310 includes a key feature rearrangement component 345 to rearrange the key feature information into two different videotube data structures that are efficient for activity recognition processing; a spatiotemporal videotube and a scalable tensor videotube. The key feature rearrangement component 345 may be configured to generate one or both of the two different structures.

Figure 17:
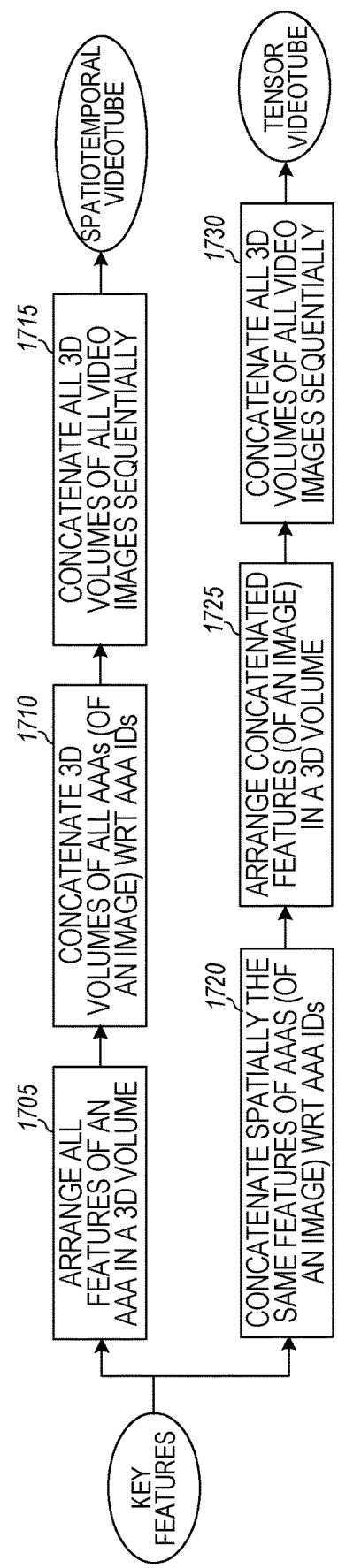
FIG. 17 is a flow diagram illustrating the rearrangement of key features for two different videotube structures according to example embodiments.

FIG. 17 is a flow diagram illustrating the rearrangement of key features for the two structures. The top flow is for a spatiotemporal videotube and the bottom flow is for a scalable tensor videotube. To form the first structure, the key feature rearrangement component 345 retrieves all detected hand sections from the multiple occupants in the vehicle cabin and concatenates them all together. Each hand section contains key feature frames including the hand image portion, the hand motion flow, and the heatmap of the detected object or objects. This structure stores information for multiple occupants to maximally collect the ROI information.

The spatiotemporal videotube structure arranges key features of the same AAA into a 3D volume at 1705. Then spatial normalization is performed on all AAAs in the same image to have all AAAs to have the same spatial size. At 1710 and 1715, all AAAs are then concatenated sequentially with respect to AAA identities (e.g. IDs). Temporal normalization is performed on the 3D data of different images to have final spatiotemporal videotube. This type of videotube has the same spatial size. At each frame the length of the key frames may vary depending on the number of the hands, and therefore, AAAs. A fixed number of AAAs can also be imposed and the missing AAAs can be left blank.

For the scalable tensor videotube, the key feature rearrangement component 345 organizes the key feature information for the tensor videotube. The scalable tensor videotube can be thought of as a focal image for one single raw image that contains only the information needed for the activity recognition process.

At 1720, the separate key features are spatially concatenated each with respect to their identities (e.g., person, left, hand, right hand). This spatially concatenated image contains the same modality components of all AAAs of an image. For instance, a spatially concatenated color image contains all color layers of the AAAs of the image. The spatially concatenated image can contain multiple rows of the corresponding AAA images where each row comprises the features (e.g. color, motion flow, etc.) of the same person, for instance, two hands of a person while the number of the rows depends on and scalable to the number of persons in the video. This can be accomplished because the identity if the AAAs are known. Thus, a spatially concatenated image captures all AAAs. If one hand is missing for a person who has been detected for a certain period of time, corresponding section may be blank (zero) to indicate a lost state of the hand. However, if the occupant has never been detected before, the spatially concatenated image may not create new rows for that occupant. For a video frame (image), at 1725 the concatenated images are arranged into a 3D volume keeping the order of features same for each video frame. At 1730, all 3D volumes of all video frames are concatenated sequentially to obtain the tensor videotube of the video stream.

Figure 18:
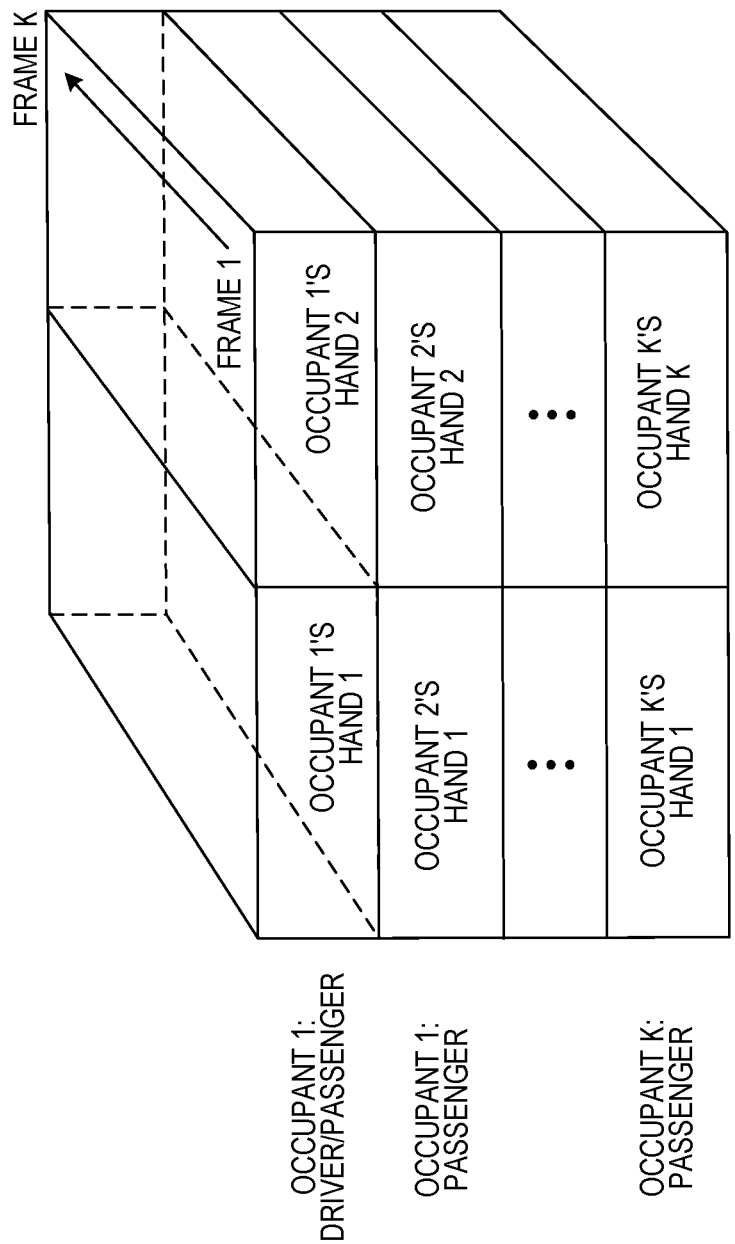
FIG. 18 is an illustration of a graphical three dimensional representation of a scalable tensor videotube according to example embodiments.

FIG. 18 is an illustration of a graphical three dimensional representation of a scalable tensor videotube. In the y-direction of the Figure, one row is generated for each occupant of the vehicle cabin. In the x-direction, two columns are formed one for each hand of each occupant. In the z-direction the frames of key feature data (frames 1 through K) are organized by the occupant and the hand of the occupant. Instead of using a fixed set of surveillance channels, the present approach to key feature organization can be scalable with respect to the existence of occupants in cabin. Each frame of the focal image comprises a scalable tensor videotube for the video stream.

Each hand section contains key feature frames like hand image portion or patch, hand motion flow, and heatmap of the objects. All hand sections are tied to same raw image frame. The focal image allows all hand sections from all occupants in the cabin to be monitored at the same time. If a hand is missing for an occupant who has been detected for a certain period of time, the corresponding hand section will be masked (e.g., blank or filled in by black) to indicate the lost state of the hand. In the event that an occupant is detected that was not detected before, an identity may be assigned to the new occupant and new rows in the scalable tensor videotube can be created for the new occupant. Also, corresponding motion profiles and object heatmaps can be included and arranged in the scalable tensor videotube for the new occupant.

A tensor videotube is created with knowledge of a person's hand identities, which makes it very convenient to look for a specific hand of a specific person. This can be viewed as similar to looking for a specific channel in surveillance videos. Also, since each row of the scalable tensor videotube corresponds to one person, each row of the tensor videotube can directly feed into classifier to acquire person's overall activities. It does not need to detect individual hand's activity and require another classifier to determine person's overall activities.

Figure 19:
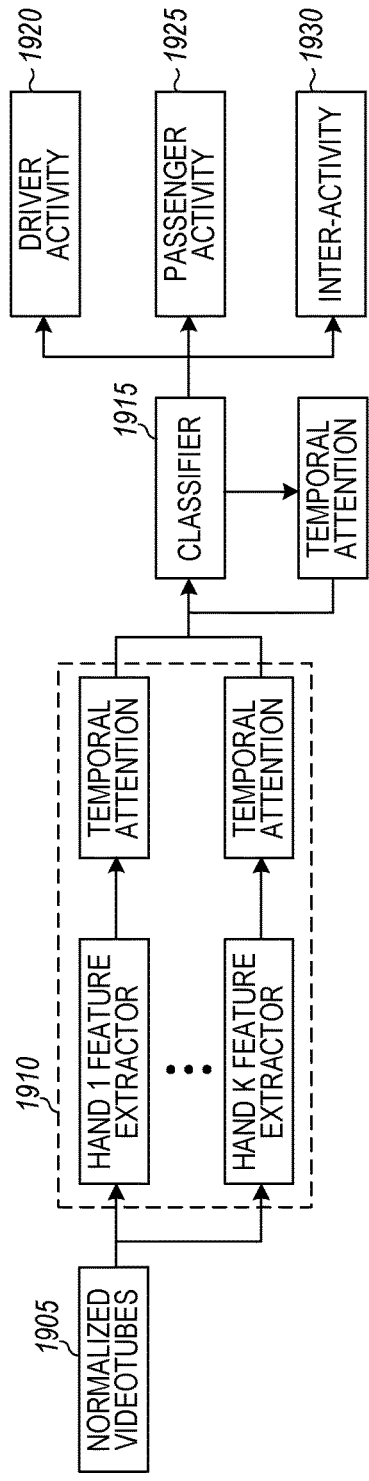
FIG. 19 is a block diagram of an example of a specific activity recognition network architecture that is based on videotubes according to example embodiments.

Normalized videotubes or the further scaled and rearranged videotubes are input fed into an activity classifier component to identify activities of the occupants, such as by using determined motion and locations of objects within the identified active areas. FIG. 19 is a block diagram of an example of a specific activity recognition network architecture that is based on videotubes. Normalized videotubes 1905 are input to the activity recognition classifier.

Each hand section of a videotube is fed into a separate hand feature extractor 1910 (e.g., one extractor for each of K hands detected in the vehicle). Temporal attention to information in the videotubes can be achieved by taking advantage of the organization of the key feature memory mechanisms to track the temporal information of ROIs. The hand feature extractors and the temporal attention form a pipeline. The pipeline is scalable with respect to hand sections. All hand sections can then be concatenated and fed into deep learning based classifier 1915 to identify activity. Some examples of deep learning technologies include Recurrent Neural Networks (RNN) and Long/Short Term Memory (LSTM). In the RNN, the machine learned key features of hands and objects are concatenated with hand motion information. This concatenated information is input into the LSTM sequentially to identify an activity. It may be needed to input categories of objects or hand motion to the LSTM beforehand.

The heatmaps of objects can be used to pre-select highly relative activities, and hand image portions and motion flow information is used to further confirm and recognize types of activity and identify occupants corresponding to the activity. The final output specific activity recognition network are different categories for standalone activities of the driver 1920, standalone activities of the passenger or passengers 1925, and interactive activities between the driver and passenger 1930.

Figure 20:
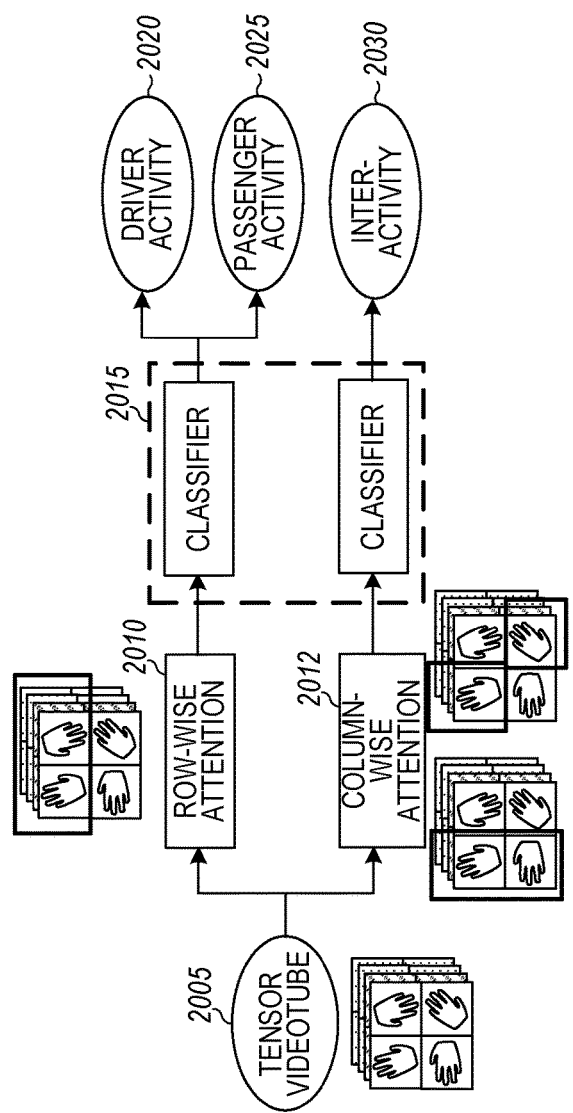
FIG. 20 is a block diagram of another example of a specific activity recognition network architecture that is based on videotubes according to example embodiments.

FIG. 20 is a block diagram of another example of a specific activity recognition network architecture that is based on tensor videotubes. The activity recognition classifier is a specific network architecture based on videotubes. Each AAA section of a tensor videotube 2005 is fed into separate attention mechanisms, either row-wise 2010, column-wise 2012 (including diagonally), or as a whole. The corresponding AAAs are then be concatenated and fed into a classifier 2015. The classifier can be based on deep learning or other machine learning approach. The final output different categories for standalone activities of the driver 2020, standalone activities of the passenger or passengers 2025, and interactive activities between the driver and passenger 2030.

The organized nature of tensor videotubes allows for a robust, innovative, and easier way to detect activities (singular and multi-person activities). Since each row in a tensor videotube identifies a person it is easier for the present disclosure to keep track of each person as well of the activities performed by each person. In case key features do not contain the learned features, a deep learning based convolutional neural net is applied to extract such features as desired. The key features (object heatmaps, hand patch layer and motion flow, etc.) indicate highly relative activities and provide more information for the activity types and the corresponding occupants.

Activity recognition based on tensor videotubes can be achieved by two different ways: row-wise attention and column-wise attention, respectively. By feeding each row of tensor videotube to the classifier, individual activity (e.g. driver activity and passenger activity) can be recognized through the classifier. The activity recognition classifier component selects a row-wise configuration of AAAs within the scalable tensor videotube according to the identity of the person and apply the selected row-wise configuration of AAAs as the input to the machine deep learning to identify the activity of the person.

Alternatively, feeding columns of the tensor videotube enables the classifier to recognize interactive activity between different persons. Registry of each AAA is used to activate column-wise AAA. For example, two hands registered under the same object will be extracted to recognize interactive activities. The activity recognition classifier component selects a column-wise configuration of AAAs within the scalable tensor videotube according to identities of multiple persons, and applies the selected column-wise configuration of AAAs as the input to the machine deep learning to identify an interactivity between the multiple persons Activity recognition based on tensor videotube allows recognizing individual activities of multiple categories. Also, it can differentiate activities from driver to passengers, which is crucial when it comes to safety because activities allowed by passengers may be dangerous to driver. By simply looking column-wise at tensor videotube, the activity recognition system can re-use AAAs to recognize interactive activities. Similarly, multiple interactivities of multiple groups of people (for example, the driver is taking a water bottle from the passenger sitting in the front seat and two passengers in the backseat are shaking hands) can be recognized by selecting multiple column-wise AAA configurations within the tensor videotube and applying the activity recognition classifier only on the selected portion of the tensor videotube.

Multi-person activity is generally difficult for machine recognition. Conventional methods tend to treat multiple activities between humans separately. Yet, people may perform multiple activities at the same time, and alongside or with each other. And because it is desirable to identify all activities that can occur, it is imperative to organize the data in a way that makes it easy for the system to analyze the data. The present systems and methods try to account for the fact that multiple activities can be performed at the same time. Tensor videotubes allow the system to discriminate between different activities in a parallel and connected manner due to the multidimensional nature of a tensor videotube. The activity recognition classifier component may select multiple column-wise configuration of AAAs within the scalable tensor videotube according to identities of multiple groups of persons, and apply the selected multiple column-wise configuration of AAAs as the input to the machine deep learning to identify multiple interactivities between the multiple groups of persons.

As mentioned previously herein, the tensor videotubes contain information such as hand pixels information, hand motion flow information, and object heatmap information. Because many object and hands may overlap in several rows of each videotube, a classifier can be capable of detecting that several hands (from different individuals) are either, interacting with the same object, or the hands might be interacting with each other. All that information can be summarized in a tensor videotube, making it easier for a deep learning algorithm to learn this relationship and patterns. These attributes and features make a tensor videotube an easy to use and efficient activity descriptor, not only for singular person activities, but also for multi-person activity recognition.

Existing methods of activity recognition uses entire frames to recognize human's activities. They look at the whole screen including background clutter irrelevant body parts, which involves lots of noise in recognition. Also, existing methods don't have the clue of each hand's activity. When people is performing two activities at the same time, existing methods may not be sophisticated to understand each hand's activity. In the case of driver operating the navigation panel with one hand while handling the steering wheel with the other hand, existing methods may be confused while our method recognize each hand's activities to understand person's overall activities.

Additional Hand Motion Embodiments

As explained previously herein, hand gesture and hand motion flow are useful to understand the activities of the driver and passenger in a vehicle. When a videotube is generated, it includes a sequence of images from one or more windowed portions of the image frames of the video stream. The sequence of images of the videotube can be used to determine a sequence of motions that can be processed to identify activity.

In some embodiments, the motion flow component 1137 of FIG. 11 identifies pixels of the image frames that include the hand image in the videotube, and tracks the changes in the pixels that include the hand image. Tracking the change in pixels that include the hand between image frames of the frame sequence indicates the direction of the moving hand at the pixel level. Limiting the tracking to the videotube reduces the processing necessary to track the change in pixels and determine hand motion. This tracking can be referred to as optical flow. The optical flow provides information for each fingertip and joint points which can be fed into an activity recognition network to determine activity.

Figure 21:
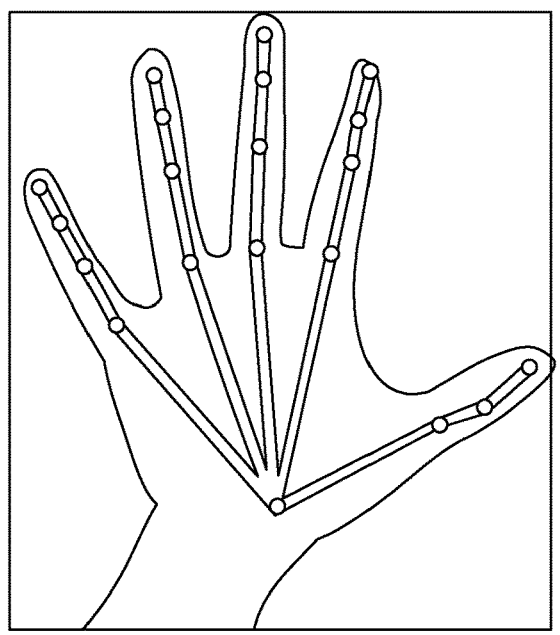
FIG. 21 is an illustration of a portion of an image frame that includes the hand area according to example embodiments.

In some embodiments, the motion flow component 1137 performs hands pose detection on the identified hand area of the videotube to identify hand motion. FIG. 21 is an illustration of an example of a portion of an image frame including the hand area. The hand pose detection estimates the location of the fingertips and joint points in the image patch. Tracking the change in fingertips and joint points between the image frames can determine hand motion. The fingertip and joint point information can be fed into an activity recognition network to determine activity.

In some embodiments, a pre-trained three dimensional (3D) hand model is loaded into memory. The 3D model may be stored as a data structure representative of physical aspects of a hand in each of three mutually orthogonal axes. The 3D model may be a hand model that is generic to all skin colors, sizes, and shapes. In variations, the 3D hand model is a specific hand model learned for certain categories of people or just one specific person. The motion flow component 1137 may captures and segments the hand from the videotube images. The motion flow component 1137 generates a 3D hand representation from the videotube images by matching the hand contours and key points of the two dimensional (2D) frames to the 3D model. The changes in the generated 3D hand representation over time includes more information on the gestures and motion of the hand than other approaches. This motion flow is a key feature of information that can be fed into the activity recognition network to determine activity.

Additional Activity Recognition Embodiments

The activity recognition classifier component 355 of FIG. 3 uses the machine extracted key feature information related to the identified hand images, objects, heat maps and motion flow, to either directly or indirectly identify an activity of an occupant.

In some embodiments, the activity recognition classifier component 355 applies the key feature information directly using rule-based activity recognition. In rule-based activity recognition, a computer-detected combination of one or more objects and hand motions is compared to one or more combinations of objects and hand motions stored in a memory to associate an activity with the detected combination. The memory may store combinations of different objects and hand motions. The objects and motions are combined according to clear rules that indicate different activities. For example, if the system detects a cell phone in a driver's hand and detects that the driver is performing the hand motion of touching the phone. The system identifies that the activity is the driver texting using the phone. The system performs the machine identification using a predefined rule that may be reflected by the combinations stored in the memory.

In some embodiments, the activity recognition classifier component 355 applies the information of hand images, objects, heat maps and motion flow obtained for the videotubes to machine learning technologies to identify the activity. Some examples of machine learning technologies include the Hidden Markov Model (HMM) or Random Forest (RF). In the HMM machine learning, the hand images, objects, and hand motions are input into a Markov process to identify an activity. In the Random Forrest (RF) machine learning, the hand images, objects, and hand motions are applied to multiple decision trees constructed during a training process and the RF outputs the mode of the classes of the individual decision trees to identify an activity. The activity recognition classifier component 355 applies information related to a sequence of hand motions detected using the videotube as input into the machine learning technology. An activity is selected from one or more specified activities by the machine learning technology.

In some embodiments, the activity recognition classifier component 355 applies the information of hand images, objects, and hand motions to deep learning technologies to identify the activity. Some examples of deep learning technologies include Recurrent Neural Networks (RNN) and Long/Short Term Memory (LSTM). In the RNN, machine learned features of objects are concatenated with hand motion information such as optical flow. This concatenated information is input into the LSTM sequentially to identify an activity. It may be needed to input categories of objects or hand motion to the LSTM beforehand.

In some embodiments, concatenated videotubes are generated and a neural network is used per hand videotube to identify an activity per hand. Creating the scalable tensor videotube may be skipped and each videotube for each hand may be fed directly into a neural network for processing. The activity recognition system may include a neural network for each identified hand, and these neural networks may be processes that are run in parallel in the vehicle processing unit (e.g., each neural network can be running as a separate program). As an example, the neural networks may use an LSTM architecture that allows the system to determine what a hand is doing, and to use this information to classify the current activity corresponding to the hand. For example, the activity recognition system can learn that the gesture of a "hand wave" is associated to a hand that is moving based on a repetitive motion in the current image stream.

When the system is learning without focusing activity areas using videotubes, a large number of training video samples may be needed in order for the system to associate pixel changes to a specific activity. For machine learning based on the entire video frame, processing speed and training can become an issue as the system needs to analyze all data and pixels, including data that is not related to the activity (e.g., objects and other pixels that are part of the background). There are also limits for the amount of memory available and limits to the speed of the hardware. More powerful hardware can increase system learning capability, but the increased capability also increases cost and power consumption of the system. Very deep neural network technologies can learn the pixel patterns associated with an activity, but these networks also require a very large number of training samples, increased memory usage in a system, and additional hyper-parameters to be fine-tuned.

Regardless of the machine learning approach, machine learning and activity detection using videotubes is more efficient, convenient, and accurate than machine learning and activity detection that uses the entire image frames of a given video stream. Using videotubes can reduce the required processing time and hardware capability needed for activity recognition.

Although the embodiments have been described in terms of using hand images to recognize human activity in a vehicle cabin, the embodiments described can be used for other video based activity recognition tasks such as video surveillance (including physical security, baby monitoring, elderly-care), livestock monitoring, biological and environmental monitoring, etc. For surveillance, the processing can be focused on human faces or entire human images instead of focused on the area of the hands. The human images can be used to detect human motion, and the images and determined motions can be used as input to an activity recognition component. For livestock monitoring, the processing can be focused on animal images.

Videotubes can be thought of as compressed versions of the original image stream that allow the activity recognition system to focus only on the part of an image useful to detect and identify activity (e.g., activity of a vehicle occupant). The embodiments described herein feed these segmented or compressed versions of the image stream into the activity recognition process or processes. This improves efficiency and reduces power consumption. This means that the embodiments can be implemented in software, hardware, or a combination of software and hardware, such as general purpose computers, smartphones, field-programmable gate arrays, and various other embedded products. Further, the embodiments improve accuracy of identifying activities because the areas of images processed to the detect activities of interest are reduced. Furthermore, the concepts can be expanded from vehicle awareness to other technological fields, including robotics (e.g., home robots, healthcare robots), military applications, and surveillance and security applications.

Figure 22:
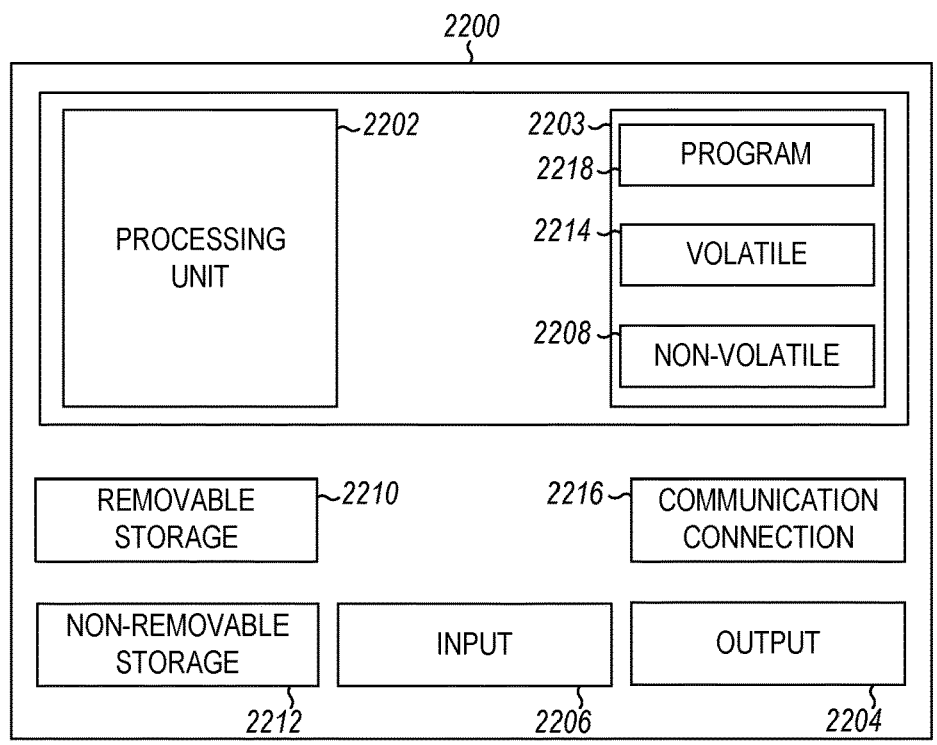
FIG. 22 is a block diagram illustrating circuitry for performing methods according to example embodiments.

FIG. 22 is a block diagram illustrating circuitry for performing methods according to example embodiments. All components need not be used in the various embodiments. One example computing device in the form of a computer 2200 may include one or more processing units 2202 (e.g., one or more video processors), memory 2203, removable storage 2210, and non-removable storage 2212. The circuitry can include a global ROI detector component, dynamic AAA detector component, a key feature generator component, a spatial normalizer component, a key feature rearrangement component, and a temporal normalizer component, and an activity recognition classifier component.

Although the example computing device is illustrated and described as computer 2200, the computing device may be in different forms in different embodiments. For example, the computing device may instead be a smartphone, a tablet, smartwatch, or other computing device including the same or similar elements as illustrated and described with regard to FIG. 22. Devices, such as smartphones, tablets, and smartwatches, are generally collectively referred to as mobile devices or user equipment. Further, although the various data storage elements are illustrated as part of the computer 2200, the storage may also or alternatively include cloud-based storage accessible via a network, such as the Internet or server based storage.

Memory 2203 can be configured to store a data structure such as frames of image data as described herein. Memory 2203 may include volatile memory 2214 and non-volatile memory 2208. Computer 2200 may include—or have access to a computing environment that includes—a variety of computer-readable media, such as volatile memory 2214 and non-volatile memory 2208, removable storage 2210 and non-removable storage 2212. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions, including instructions that configure the processing unit 2202 to perform embodiments of network bridging protocols described herein.

Computer 2200 may include or have access to a computing environment that includes input 2206, output 2204, and a communication connection 2216. Output 2204 may include a display device, such as a touchscreen, that also may serve as an input device. The input 2206 may include one or more of a touchscreen, touchpad, mouse, keyboard, camera, one or more device-specific buttons, one or more sensors integrated within or coupled via wired or wireless data connections to the computer 2200, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 2202 of the computer 2200. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage such as a storage area network (SAN) indicated at 2220.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. An activity recognition device for a vehicle, the activity recognition device comprising: a port configured to receive a video stream from a video source, wherein the video stream includes an image of a hand of an occupant of a vehicle compartment and an image of at least one other object in the vehicle compartment; a memory configured to store instructions and image frames of the video stream; one or more processors, wherein the one or more processors execute the instructions stored in the memory, the one or more processors configured to: select portions of the image frames based on presence of the hand in the image frames; identify active areas within the selected portions of the image frames that include information of motion of the hand and location of the at least one other object; determine motion of the hand and locations of the at least one other object within the identified active areas of the selected portions of the image frames, wherein an order of the image frames includes temporal information of the hand and the at least one other object: and identify an activity according to the determined motion of the hand and locations of the at least one other object using the identified areas of the selected portions of the image frames; and an operator interface, wherein the one or more processors are further configured to initiate one or both of visual feedback and audible feedback according to the identified activity using the operator interface.

2. The activity recognition device of claim 1, wherein the one or more processors are configured to:
   determine a similarity score between a first windowed portion of a first image frame and the same first windowed portion of a second image frame, wherein an identified active area of hand activity is included in the first windowed portion of the first and second image frames;
   omit processing of the first windowed portion of the second image frame when the similarity score is greater than a specified similarity threshold; and
   when the similarity score is less than the specified similarity threshold, perform detection of the hand in the second image frame to generate a second windowed portion of the image frames of the video stream more likely to include an image of the hand than other portions of the image frames, and include the second windowed portion of the image in a videotube that includes a collection of rearranged portions of the image frames of the video stream.

3. The activity recognition device of claim 1, wherein a time interval between successive processed image frames of the image frames is non-uniform.

4. The activity recognition device of claim 1, wherein the one or more processors are configured to: identify active areas in the image frames likely to include hand activity; identify pixels of the identified active areas that include a hand image; and track a change in pixels of the selected portions of the image frames that include the hand image to determine hand motion.

5. The activity recognition device of claim 1, wherein the one or more processors are configured to:
   identify active areas in the image frames likely to include hand activity;
   determine locations of fingertips and joint points of the hand in the image frames; and
   track the change in fingertips and joint points between active areas of the image frames to determine the hand motion.

6. The activity recognition device of claim 1, wherein the one or more processors are configured to:
   determine a hand motion; and
   identify the activity using the determined hand motion and the at least one other object.

7. The activity recognition device of claim 6, wherein the one or more processors are further configured to:
   compare a combination of the determined hand motion and the at least one other object to one or more combinations of hand motions and objects stored in the memory; and
   identify the activity based on a result of the comparison.

8. The activity recognition device of claim 6, wherein the one or more processors are further configured to:
   detect a sequence of hand motions using the determined areas of the image frames;
   compare the detected sequence of hand motions to a predetermined sequence of hand motions of one or more predetermined activities; and
   select an activity from the one or more predetermined activities according to a result of the comparing.

9. The activity recognition device of claim 1, wherein the one or more processors are further configured to:
   generate a videotube that includes a collection of rearranged portions of the image frames of the video stream that include the image of the hand, the image of the at least one other object, and corresponding feature maps;
   store videotube information in the memory as a scalable tensor videotube; and
   input the scalable tensor videotube as data to a deep learning algorithm to identify the activity of the occupant.

10. The activity recognition device of claim 9, wherein the one or more processors are configured to select a row-wise configuration of portions of the image frames within the scalable tensor videotube according to the identity of the person and apply the selected row-wise configuration as the input to the deep learning algorithm to identify the activity of the occupant.

11. The activity recognition device of claim 9, wherein the one or more processors are configured to select a column-wise configuration of portions of the image frames within the scalable tensor videotube according to identities of multiple persons occupying the vehicle compartment and apply the selected column-wise configuration as the input to the deep learning algorithm to identify an interactivity between the multiple persons.

12. The activity recognition device of claim 1, wherein the video source includes an imaging array configured to provide a video stream of an image of the vehicle compartment; and
   wherein the one or more processors are included in a vehicle processing unit configured to identify an activity using the video stream of the image of the vehicle compartment.

13. A computer-implemented method of vehicle recognition of an activity, the method comprising: obtaining a video stream of a hand of an occupant of a compartment of a vehicle and at least one other object using a video source of the vehicle; selecting portions of image frames of the video stream based on presence of the hand in the selected portions of the image frames; identifying areas within the selected portions of the image frames that include information of motion of the hand and location of the at least one other object; determining a motion of the hand and locations of the at least one other object within the identified areas within the selected portions of the image frames, wherein an order of the image frames includes temporal information of the hand and the at least one other object; identifying an activity using the determined motion of the hand and locations of the at least one other object using the identified areas within the selected portions of the image frames; and providing one or both of visual feedback and audible feedback to an operator of the vehicle according to the identified activity.

14. The method of claim 13, wherein the selecting portions of image frames includes: receiving a first image frame of the video stream and a subsequent second image frame of the video stream; determining a similarity score between a first windowed portion in the first image frame and the first windowed portion in the second image frame, wherein a location of the hand is positioned in the first windowed portion of the first and second image frames; omitting processing of the first windowed portion of the second image frame when the similarity score is greater than a specified similarity threshold; and when the similarity score is less than the specified similarity threshold, triggering detection of the hand in the second image frame to generate a second windowed portion of the image frames smaller than the first windowed portion and more likely to include the hand than other portions of the image frames.

15. The method of claim 13, including:
   receiving a first image frame and a subsequent second image frame of the video stream;
   receiving a third image frame subsequent to the second image frame, wherein a time interval between the first and second image frame is different from a time interval between the second and third images frames; and
   identifying the areas within the first, second, and third image frames that include the information of motion of the hand and the location of the at least one other object.

16. The method of claim 13, wherein the identifying areas includes identifying active areas in the selected portions of the image frames likely to include hand activity; and wherein the determining the motion of the hand includes identifying pixels of the identified active areas that include a hand image and tracking a change in pixels of the selected portions of the image frames that include the hand image to determine hand motion.

17. The method of claim 13, including: wherein the identifying areas includes identifying active areas in the selected portions of the image frames likely to include hand activity; and wherein the determining the motion of the hand includes: determining locations of fingertips and joint points of the hand in the image frames; and tracking the change in fingertips and joint points between active areas of the selected portions of the image frames to determine the hand motion.

18. A non-transitory computer-readable storage medium including instructions, that when performed by one or more processors of an activity recognition device of a vehicle, cause the activity recognition device to perform acts comprising: obtaining a video stream using a video source of the vehicle, the video stream including images of a hand of an occupant of the vehicle and at least one other object; selecting portions of image frames of the video stream based on presence of the hand in the selected portions of the image frames; determining minimized areas within the selected portions of the image frames that that include information of motion of the hand and location of the at least one other object; determining a motion of the hand and locations of the at least one other object within the minimized areas of the image frames, wherein an order of the image frames provides temporal information of the hand and the at least one other object; and identifying an activity of the occupant using the determined motion of the hand and locations of the at least one other object using the minimized area of the image frames.

19. The non-transitory computer-readable storage medium of claim 18, including instructions that cause the activity recognition device to perform acts including:

determining a next window of a minimized area using the determined motion of the hand;

performing image detection of the hand using the next window;

replacing the current window with the next window when the next window contains boundaries of a detected image of the hand; and when the boundaries of the detected hand image extend beyond the next window:

merging the current window and the next window;

identifying an image of the hand in the merged windows; and determining a new minimized window size that contains the identified image of the hand.

20. The non-transitory computer-readable storage medium of claim 18, including instructions that cause the activity recognition device to perform acts including:

detecting a sequence of hand motions using the determined areas of the image frames;

comparing the detected sequence of hand motions to a specified sequence of hand motions of one or more specified activities; and identifying the activity by selecting an activity from the one or more specified activities according to a result of the comparing.

* * * * *

UNITED STATES PATENT AND TRADEMARK OFFICE
CERTIFICATE OF CORRECTION

Page 1 of 2

PATENT NO. : 11,100,316 B2
APPLICATION NO. : 16/822923
DATED : August 24, 2021
INVENTOR(S) : Porikli et al.

It is certified that error appears in the above-identified patent and that said Letters Patent is hereby corrected as shown below:

In the Claims

In Column 28, Line 23, in Claim 1, after "comprising:", insert a linebreak

In Column 28, Line 27, in Claim 1, after "compartment;", insert a linebreak

In Column 28, Line 28, in Claim 1, after "stream;", insert a linebreak

In Column 28, Line 31, in Claim 1, after "to:", insert a linebreak

In Column 28, Line 32, in Claim 1, after "frames;", insert a linebreak

In Column 28, Line 35, in Claim 1, after "object;", insert a linebreak

In Column 28, Line 40, in Claim 1, delete "object:" and insert --object;-- and a linebreak therefor In Column 28, Line 43, in Claim 1, after "and", insert a linebreak In Column 29, Line 5, in Claim 4, after "to:", insert a linebreak In Column 29, Line 6, in Claim 4, after "activity;", insert a linebreak In Column 29, Line 8, in Claim 4, after "and", insert a linebreak In Column 30, Line 10, in Claim 13, after "comprising:", insert a linebreak In Column 30, Line 13, in Claim 13, after "vehicle;", insert a linebreak In Column 30, Line 15, in Claim 13, after "frames;", insert a linebreak Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,100,316 B2

In Column 30, Line 18, in Claim 13, after "object;", insert a linebreak

In Column 30, Line 22, in Claim 13, after "object;", insert a linebreak

In Column 30, Line 25, in Claim 13, after "and", insert a linebreak

In Column 30, Line 29, in Claim 14, after "includes:", insert a linebreak

In Column 30, Line 31, in Claim 14, after "stream;", insert a linebreak

In Column 30, Line 35, in Claim 14, after "frames;", insert a linebreak

In Column 30, Line 38, in Claim 14, after "and", insert a linebreak

In Column 30, Line 63, in Claim 17, after "including:", insert a linebreak

In Column 30, Line 66, in Claim 17, after "and", insert a linebreak

In Column 30, Line 67, in Claim 17, after "includes:", insert a linebreak

In Column 31, Line 1, in Claim 17, after "and", insert a linebreak

In Column 31, Lines 8-9, in Claim 18, after "comprising:", insert a linebreak

In Column 31, Line 11, in Claim 18, after "object;", insert a linebreak

In Column 31, Line 14, in Claim 18, after "frames;", insert a linebreak

In Column 31, Line 15, in Claim 18, delete "that that" and insert --that-- therefor In Column 31, Line 17, in Claim 18, after "object;", insert a linebreak In Column 31, Line 21, in Claim 18, after "and", insert a linebreak